(12) United States Patent
Chio

(10) Patent No.: US 8,001,948 B2
(45) Date of Patent: Aug. 23, 2011

(54) KINETIC ENERGY GENERATION APPARATUS HAVING INCREASED POWER OUTPUT

(76) Inventor: Chuy-Nan Chio, Taipei (TW)

( * ) Notice: Subject to any disclaimer, the term of this patent is extended or adjusted under 35 U.S.C. 154(b) by 869 days.

(21) Appl. No.: 12/022,354

(22) Filed: Jan. 30, 2008

(65) Prior Publication Data

US 2009/0188337 A1    Jul. 30, 2009

(51) Int. Cl.
*F02B 75/32* (2006.01)

(52) U.S. Cl. ............... 123/197.4; 74/52; 74/579 E

(58) Field of Classification Search .... 123/197.1–197.4; 74/52, 579 R, 579 E
See application file for complete search history.

(56) References Cited

U.S. PATENT DOCUMENTS

| | | | | |
|---|---|---|---|---|
| 2,093,997 A * | 9/1937 | Butler | ............... | 74/580 |
| 3,886,805 A * | 6/1975 | Koderman | ............... | 74/52 |
| 4,044,629 A | 8/1977 | Clarke | | |
| 4,073,196 A | 2/1978 | Dell | | |
| 5,040,502 A * | 8/1991 | Lassiter | ............... | 123/197.4 |
| 5,755,195 A * | 5/1998 | Dawson | ............... | 123/197.4 |
| 6,526,935 B2 * | 3/2003 | Shaw | ............... | 123/197.4 |
| 2002/0185101 A1 * | 12/2002 | Shaw | ............... | 123/197.4 |

FOREIGN PATENT DOCUMENTS

| | | |
|---|---|---|
| GB | 2297599 A | 7/1996 |
| WO | PCT/CN2005/000992 | 1/2007 |

* cited by examiner

Primary Examiner — Noah Kamen
(74) Attorney, Agent, or Firm — Chun-Ming Shih

(57) ABSTRACT

A kinetic energy generation apparatus having increased power energy includes a casing, a fixed gear, and a free gear, disposed on the inner side of the fixed gear and has a gear ratio equal to 3:1. The apparatus also includes a transmission portion, with a bushing disposed between the transmission portion and the casing, which is driven to rotate by the free gear and has an axis of output extended. The apparatus also includes a connecting rod having one end pivoted on a piston of a cylinder.

10 Claims, 28 Drawing Sheets

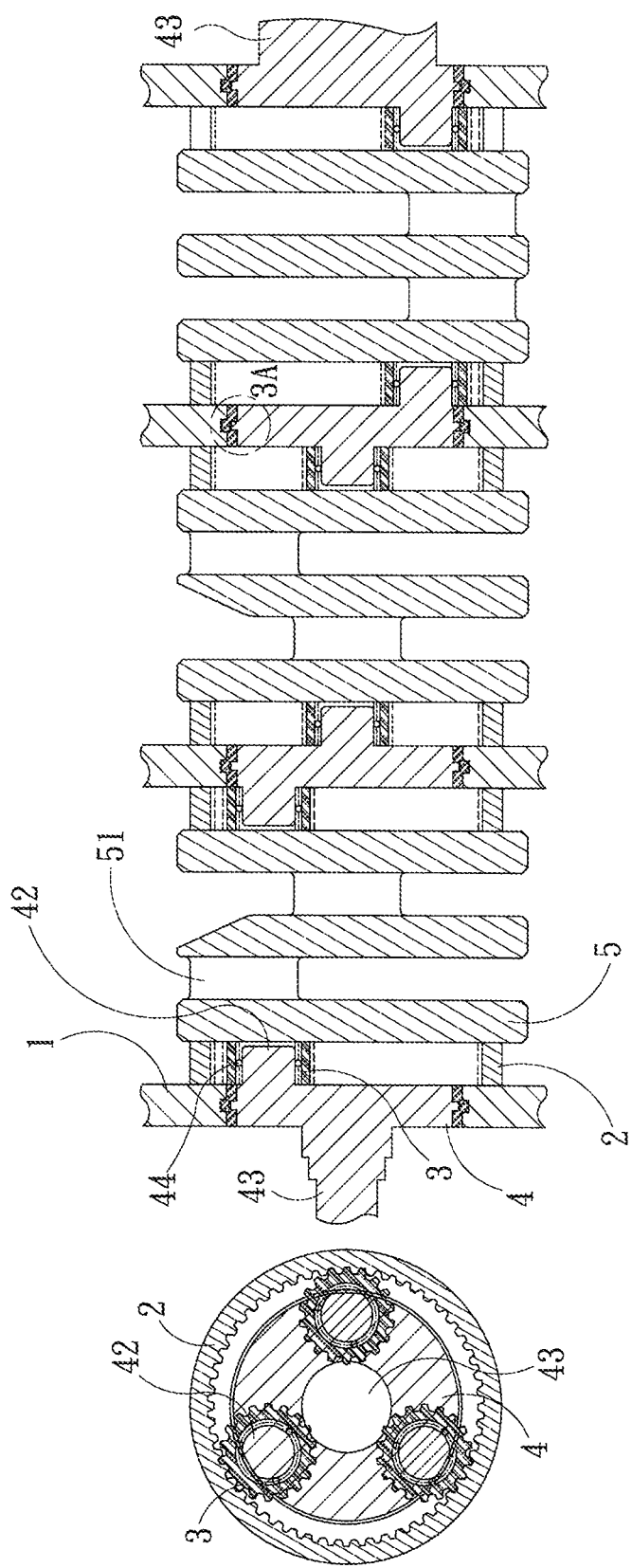

KINETIC ENERGY GENERATION APPARATUS HAVING INCREASED POWER OUTPUT

FIELD OF THE INVENTION

The present invention relates to a kinetic energy generation apparatus having increased power output, particularly to a kinetic energy generation apparatus with diminishing loss of lateral component of force, increasing output power, low revolving speed, high torsion and decreasing vibration.

DESCRIPTION OF THE PRIOR ART

The operation mode of a conventional engine is shown as FIG. 23. When it is burned in the cylinder the piston x1 of the cylinder pushes a transmission portion x2 to drive a crankshaft x3 to revolve to generate kinetic energy output. As for the transmission portion x2, due to the moving direction of the transmission portion x2 has a very large extent of lateral pressure angle there is a very large extent of lateral component of force generated and causes the overall kinetic energy loss. Furthermore, when a conventional engine is at the dead point the inertia force of the force exertion point x4 and the crankshaft x3 are counteracted each other. It not only causes the loss of kinetic energy but also a phenomenon of vibration and results in the engine damage and shortens the life time.

Furthermore, the conventional engine goes through four actions of induction, compression, explosion and exhaust in each stroke. At this moment the crankshaft has rotated two cycles around the output axis, i.e. each explosion stroke has to drive the engine to output two cycles. Consequently the output torsion is lower. Therefore, the engine has to increase revolving speed or increase cylinder capacity to provide larger torsion for the engine.

There have been a lot of solutions to improve the engine in market. As the U.S. Pat. No. 4,044,629 shown in FIG. 24, the crankshaft axis is sleeved on an eccentric wheel 8 which is disposed in an outer gear 7. When the outer gear 7 engages an inner gear 15 to revolve the engine efficiency is increased by modifying the force exertion direction of the axis 6 by means of the eccentric wheel 8. Furthermore, as the U.S. Pat. No. 4,073,196 shown inn FIG. 25 wherein the crankshaft axis 26 is connected to an outer gear 43a by a cantilever 40a to revolve an inner gear 44; then the kinetic energy is transmitted by the outer gear axis center 37 to enhance the engine efficiency by adjusting the force exertion direction of the axis center 37 via the cantilever 40a.

However, the two abovementioned conventional technologies do not completely solve the drawbacks of lateral pressure loss and unstable vibration. Each explosion in cylinder still has to drive the engine to output two cycles. It causes the engine revolving speed and volume can not be diminished. The output torsion is still low.

Additionally, as to an air compressor structure which is similar to an engine in structure such as the structure diagram of the UK patent with patent number GB2297599A "A CYLINDER HAVING A PISTON ASSEMBLY CAPABLE OF STOPPING ONCE WHEN HAVING MOVED UP AND DOWN EVERY TIME" as shown in FIG. 26A. FIG. 26B is a diagram of actions of the same patent which has a casing 5 with an inner gear 3 disposed at the inner rim. The inner gear 3 is engaged with an outer gear 2 which is connected with a vice crankshaft 1. One end of the vice crankshaft 1 is connected with a piston and a connecting rod 6. The outer gear 2 is inserted into the main crankshaft 4 by a lower axis 12 to transmit kinetic energy output. By means of the revolving complementary function of the inner gear 3 and outer gear 2, a structure of the cylinder and connecting rod 6 capable of stopping once when having moved up and down every time for increasing induction energy storage is obtained.

However, based on a detailed result tested by the inventor of the present invention the abovementioned air compressor structure is merely a theoretical design and lacks of practical test. As to the tracking diagram of FIG. 26C derived from FIG. 26A and FIG. 26B by the inventor of the present invention, the trajectory line d2 represents an actual trajectory of FIG. 26A. Point p1 (triangle) is the position of the force exertion point A which the outer gear 2 rotates 180° of the circumference of the inner gear 3. Point 3 is the position of the force exertion point A which the outer gear 2 rotates 360° of the circumference of the inner gear 3. In fact it shows that the trajectory line d1 of the air compressor structure has not completed its stroke at point p1~p3 yet. For example, point p1 is not the lowest position of the force exertion point A1, but it is at the position of point p2 (rectangular) when the outer gear 2 rotates 240° of the circumference of the inner gear 3. In other word, the piston and connecting rod 6 of the air compressor structure still have up and down movements in the 180°~360° energy storing process which is not a balanced energy storing state as the three illustrations shown in FIG. 26A. In fact the piston and connecting rod are not at the same length in the three illustrations of the FIG. 26A; otherwise it can not show the false impression that the three sets of piston and connecting rod are at the same height. Therefore, there is still energy loss in the 180°~360° operation process of the air compressor structure and the required energy storing power enhancement is not achieved.

Furthermore, when the piston and connecting rod 6 complete one cycle of up and down stroke, the outer gear 2 has to rotate the inner gear 3 two cycles. But in fact due to the ratio of the inner gear 3 and outer gear 2 the outer gear 2 has rotated three cycles. It means the outer gear 2 has to revolve three cycles to complete an energy storing action. The process still consumes energy and does not achieve the expected effect of enhancing energy storage.

Additionally, the inventor of the present invention further researches and finds the trajectory line d1 is the design that the force exertion point A moves downward and the trajectory lines d3~d4 are the designs that the force exertion point A moves upward. Therefore there are four trajectory lines d1~d4 in FIG. 26C. However, no matter what kind of design the preset lowest position point p1 is at the same level and the practical lowest point p2 is adjusted depending on the position of the force exertion point A, i.e. when the air compressor structure proceeds with the patent feature that the air compressor compresses and stores energy once per revolving two cycles, it still causes the loss of kinetic energy. Consequently the air compressor structure does not enhance storing energy effectively and is not a mature design.

As a result, the inventor of the present invention had applied "KINETIC ENERGY GENERATION APPARATUS" with patent application number PCT/CN2005/000992 (citation 1) which provides a structure having intensive explosion strokes to get higher output power in low revolving speed to have low revolving speed and high torsion. Also the kinetic energy generation apparatus has less variation of inertia angle of the axis of force exertion, decreases vibration and loss of component of force, and enhances kinetic energy output and enhancing product life time.

As shown in FIGS. 27A, 27B, 27C, citation 1 has three critical points of an axis gear 31, an axis of force exertion 51 and an engaging point 9 engaged by a fixed gear 2 and a free gear 3 which the gear ratio of the fixed gear 2 and free gear 3 equals to 3:2. When the explosion kinetic energy of a cylinder pressurizes the axis of force exertion 51 via a connecting rod 6, the inertia is formed by superposing the pressure toward the axis gear 31 by the axis of force exertion 51 (force exertion line 01) and the pressure toward the axis gear 31 by the counterforce of the engaging point 9 (force exertion line 02). The superposed force is outputted toward the transmission axis gear 42 via the axis gear 31 (force exertion line 03). As a result, the output force is greatly larger than that of a conventional structure. There is an angle formed naturally between the force exertion line 01 and force exertion line 02 to superpose the forces by means of the principle of lever and to prevent kinetic energy loss.

In citation 1 the variation of the lateral pressure angle of the connecting rod 6 is very small so that most of the inertia acts as the force driving a free gear 3 and a flywheel 5 to rotate, and diminishes the waste of lateral component of force. The free gear 3 and the flywheel 5 revolve in opposite direction to form a shape of the trajectory line "a" of the axis of force exertion 51.

However, the force disposition of citation 1 still can be improved. The main problem is shown in FIG. 27C. When the system is running it is kept stable by the engagement of the fixed gear 2 and free gear 3. Due to the allowance between gears and the way of operation such an engagement is very unstable and may produce unstable factors such as vibration and etc. to affect the precision of the system and life time. Furthermore, since the force exertion line 01 pressurized directly by the connecting rod 6 is shorter than the force exertion line 02 of the counterforce. If the magnitude of the force exertion line 01 is increased, the output force will get larger effect. Additionally, the length of the force exertion line 03 is shorter than that of the force exertion line 02. Based on the principle of lever the force exertion line 02 must provide more force to maintain an effective output of the transmission axis gear 42 so that the efficiency of power output is decreased.

Furthermore, in another patent application "KINETIC ENERGY GENERATION APPARATUS" number PCT/CN2006/002106 (citation 2) of the inventor of the present invention it provides another solution for conventional drawbacks by means of the improvement of structure.

As shown in FIGS. 28A, 28B citation 2 has three critical points of a transmission axis 42, an axis of force exertion 51 and an engaging point 9 engaged by a fixed gear 2 and a free gear 3 where the gear ratio of the fixed gear 2 and free gear 3 equals to 3:2. When the explosion kinetic energy of a cylinder 7a pressurizes the axis of force exertion 51 via a connecting rod 6 the inertia includes the superposing of the pressure toward the transmission axis 42 by the axis of force exertion 51 (force exertion line 01) and the pressure toward the transmission axis 42 by the counterforce of the engaging point 9 (force exertion line 02). The superposed force is outputted toward the transmission axis 42 via the transmission portion 4 (force exertion line 03). As a result, the output force is greatly larger than that of a conventional structure. There is an angle formed naturally between the force exertion line 01 and force exertion line 02 to superpose the forces by means of the principle of lever and prevent kinetic energy loss.

By means of the abovementioned structure when the piston 7a explodes the kinetic energy pressurizes on the axis of force exertion 51 via the connecting rod 6. The variation of the lateral pressing angle of the connecting rod 6 is very small so that most of the inertia acts as the force driving the free gear 3 and a flywheel 5 to rotate and diminishes the waste of lateral component of force. When the free gear 3 rotates the fixed gear 2 the free gear 3 and the flywheel 5 revolve in opposite direction to have the axis of force exertion 51 form the shape of trajectory line "a".

In the same way, in citation 2 when the system is running it is kept stable merely by gear engagement and may produce unstable factors such as vibration and etc. when it is running. It affects the precision of the system and life time. Furthermore, in citation 2 since the force exertion line 01 pressurized directly by the connecting rod 6 is shorter than the force exertion line 02 of the counterforce. If the magnitude of the force exertion line 01 is increased, the output force will get more efficiency. Additionally, the length of the force exertion line 03 is shorter than the force exertion line 02. Therefore the force exertion line 02 has to provide more force to maintain an effective output of the transmission axis 42. Consequently, the efficiency of the power output is still low.

The inventor of the present invention continues his research by means of the abovementioned experiences and finds the other solution to provide the best improvement for the kinetic energy generation apparatus.

SUMMARY OF THE INVENTION

The main aspect of the present invention is to provide a kinetic energy generation apparatus having increased output power, of which the explosion strokes are intensive to get higher output power in low revolving speed to form a structure having low revolving speed and high torsion.

Another aspect of the present invention is to provide a kinetic energy generation apparatus having increased output power with less variation of inertia angle of the axis of force exertion, diminishing vibration and loss of component of force and enhancing kinetic energy output.

Yet another aspect of the present invention is to provide a kinetic energy generation apparatus having increased output power, which is disposed with maximum cylinders in a limit space to largely increase the overall output kinetic energy by means of sleeve combination.

The next aspect of the present invention is to provide a kinetic energy generation apparatus having increased output power, which is available to various kinds of vertical, horizontal engines, even air compressor structure or other power mechanics.

Yet another aspect of the present invention is to provide a kinetic energy generation apparatus having increased output power, of which the disposition of cylinders is multiple cylinders, multiple angles and multiple trajectory lines to operate respectively to largely increase the output force.

The kinetic energy generation apparatus having increased output power achieving the abovementioned aspects comprises a casing with a fixed gear disposed on one side of the casing and having a retracting tooth profile, and a free gear disposed on the inner side of the fixed gear correspondingly and having an extending tooth profile, so that the fixed gear and free gear engage each other to transmit and the gear ratio of the fixed gear and free gear equals to 3:1; a transmission portion pivoted in the interior of the casing with a bushing disposed between the transmission portion and the casing, which is driven by the free gear to rotate via the transmission portion to output power by extending an output axis; a flywheel fixed to the outer side of the free gear, rotating in synchronization with the free gear and having an axis of force exertion at one end thereof, and a connecting rod having one end pivoted on the upper portion of the axis of force exertion of the flywheel and the other end pivoted on a piston of a cylinder. Herewith, when there is an explosion in the cylinder the piston is moved reciprocally on the cylinder wall which the power proceeds kinetic energy output by driving the flywheel and free gear to rotate via the connecting rod. Due to the design of the bushing structure the combination of the transmission portion and casing is more stable to stand the pressure of high speed rotation without vibration and maintains the normal kinetic energy output and stability of the product. Also the intensity of the force exertion line pressurized by the connecting rod is largely increased so that the output power is better than that of the former technology. At the same time under the feature of the present invention structure the stroke of each cylinder will move forward toward or move away from the center of the output axis concurrently. Therefore, the weight distribution of each cylinder (flywheel) can be kept balance each other at any time to decrease vibration and power loss.

BRIEF DESCRIPTION OF THE DRAWINGS

The drawings disclose an illustrative embodiment of the present invention, which serves to exemplify the various advantages and object hereof, and are as follows:

FIG. 3 is a front view of the structure of the present invention;

FIG. 4 is a side view of the structure of the V6 type cylinder disposition of the present invention;

DETAILED DESCRIPTION OF THE PREFERRED EMBODIMENT

Figure 1A:
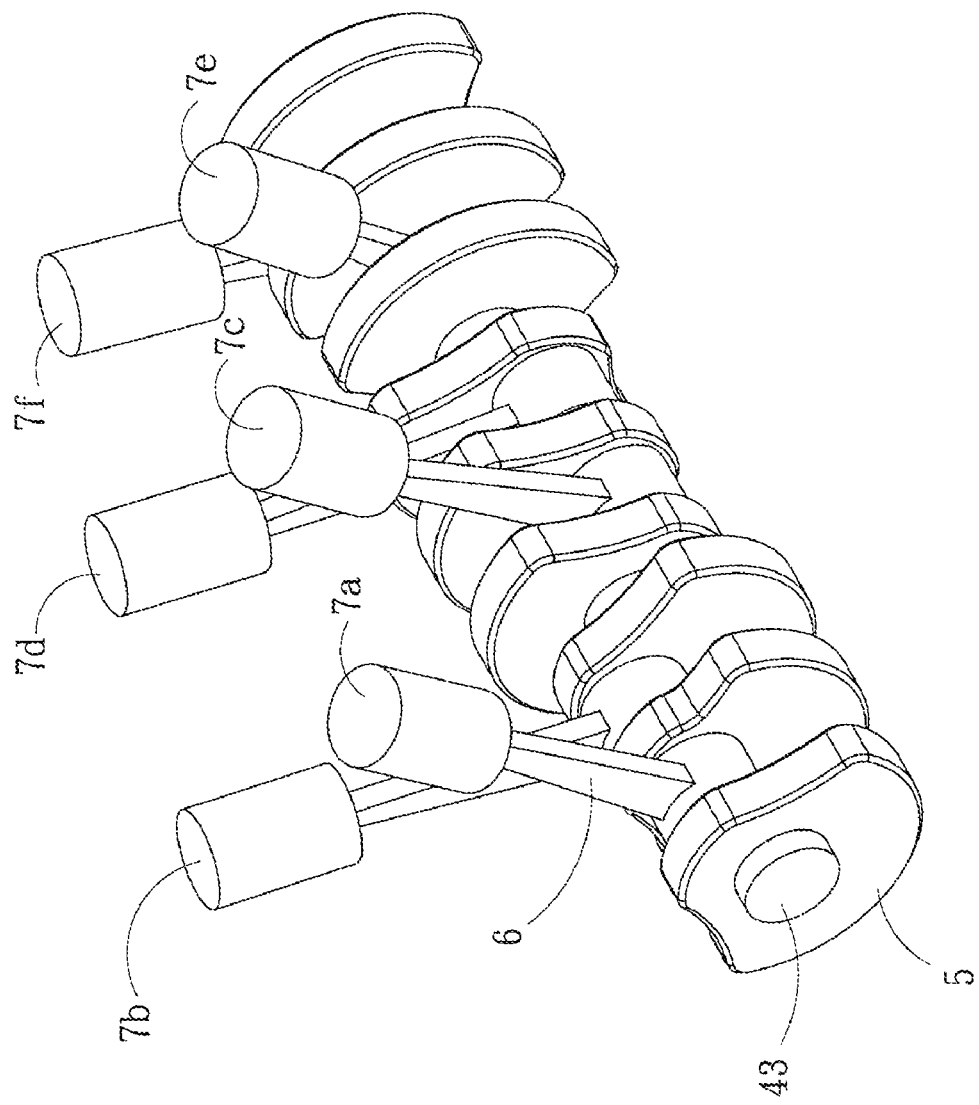
FIG. 1A is a perspective diagram of the structure of the present invention.

Referring to FIG. 2~FIG. 6, the present invention provides a kinetic energy generation apparatus having increased power energy comprises a casing 1, a fixed gear 2, a free gear 3, a transmission portion 4, a flywheel 5 and a connecting rod 6.

Figure 2:
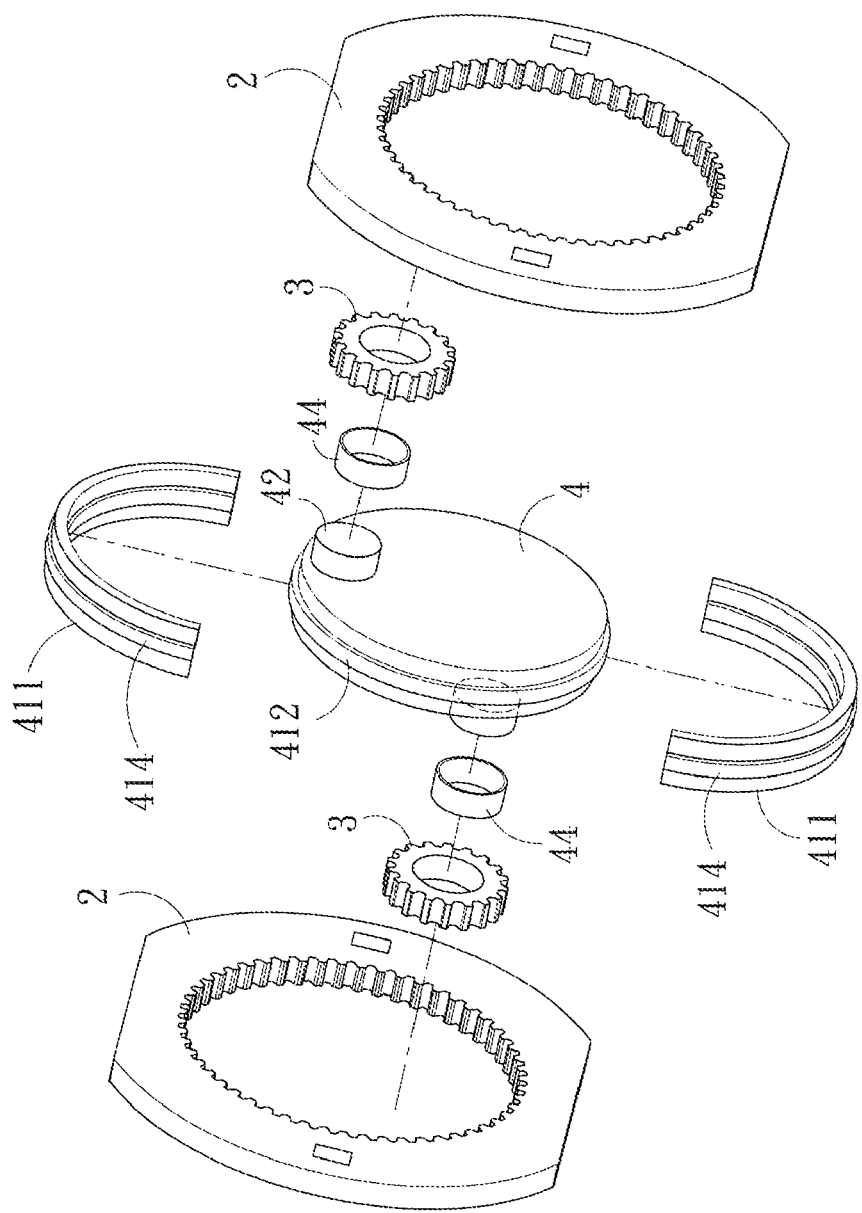
FIG. 2 is a perspective explosive view of the structure of the transmission axis of the present invention.
Figure 3A:
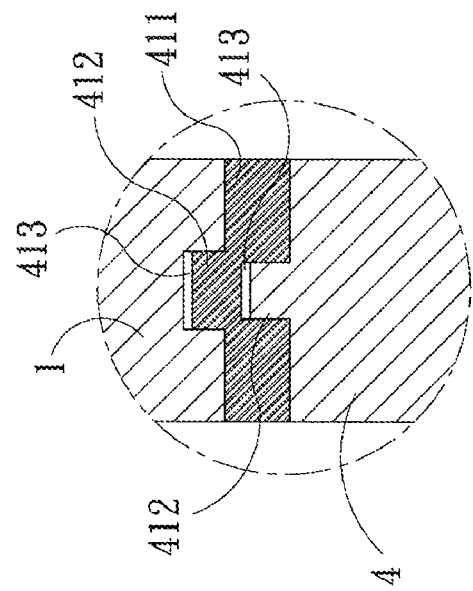
FIG. 3A is a cross-sectional view of the embodiment of the bushing structure of FIG. 3.
Figure 2B:
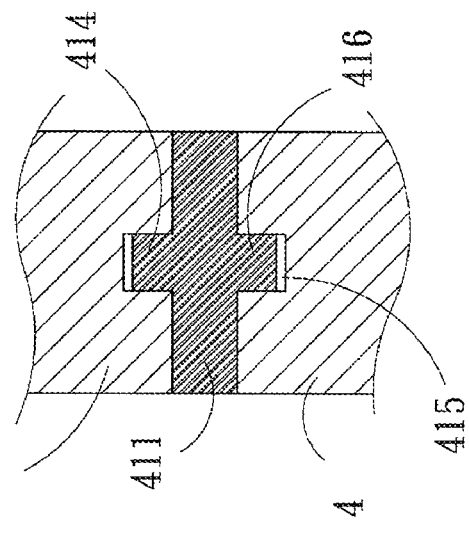
FIG. 2B is a cross-sectional view of the embodiment of the bushing structure of FIG. 2.
Figure 2A:
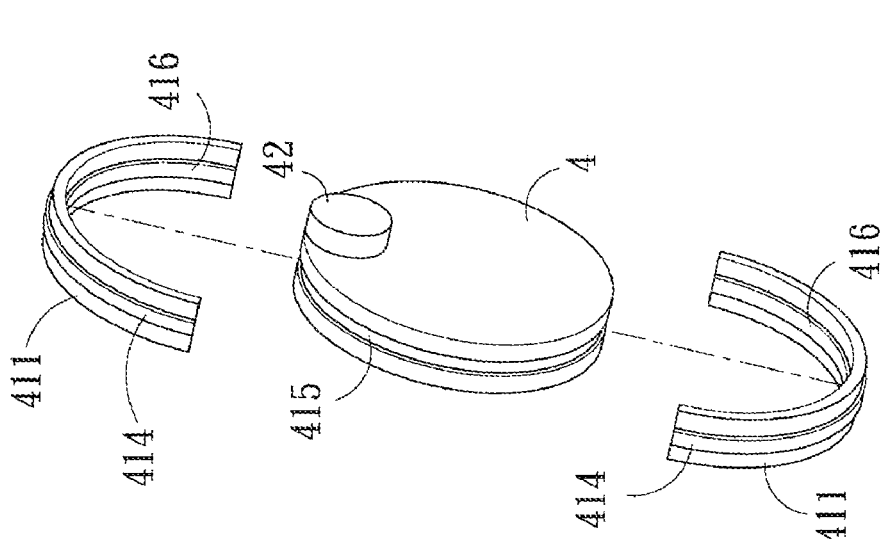
FIG. 2A is a variation diagram of the embodiment of the bushing structure of FIG. 2.

The fixed gear 2 is disposed on one side of the casing 1 and having a retracting tooth profile. The free gear 3 is disposed on the inner side of the fixed gear 2 and has an extending tooth profile, so that the fixed gear 2 and the free gear 3 can engage with each other for transmission and have a gear ratio as 3:1. The transmission portion 4 is pivoted inside the casing 1 and rotated to connect an output axis 43 to output kinetic energy. A bushing 411 is disposed at the contact surface of the transmission portion 4 and the casing 1 (as shown in FIG. 2, FIG. 3A) to enhance the stability of the rotation of transmission portion 4. To prevent the bushing 411 from biasing by pressure, the outer rim of the transmission portion 4 is disposed with a flange 412 inserted into the bushing 411 and an allowance 413 is left between the flange 412 and the bushing 411 to fill with lubricant. Similarly, a flange 414 is disposed between the bushing 411 and the casing 1 to further strengthen the structure (as shown in FIG. 2A, 2B). The transmission portion 4 is inserted toward the location of axis of the free gear 3 and pivoted with a transmission axis to have the transmission axis 42 and the free gear 3 included within the scope of the volume of fixed gear 2. A bearing 44 is disposed on the contact surface of the axis of free gear 3 and the transmission axis 42 to facilitate rotation. The fly wheel 5 is fixed to the outer side of the free gear 3 to rotate with the free gear 3 synchronously. An axis of force exertion 51 is disposed at one end of the flywheel 5 and a connecting rod 6 is pivoted on the axis of force exertion 51. One end of the connecting rod 6 is pivoted on the upper portion of the axis of force exertion 51 of the flywheel 5 and the other end is pivoted on pistons 7a~7f of a cylinder (not shown) to have pistons 7a~7f move reciprocally on the wall of the cylinder so that the pistons 7a~7f drive the flywheel 5 and the free gear 3 to rotate via the connecting rod 6 to proceed kinetic energy transmission.

Figure 1B:
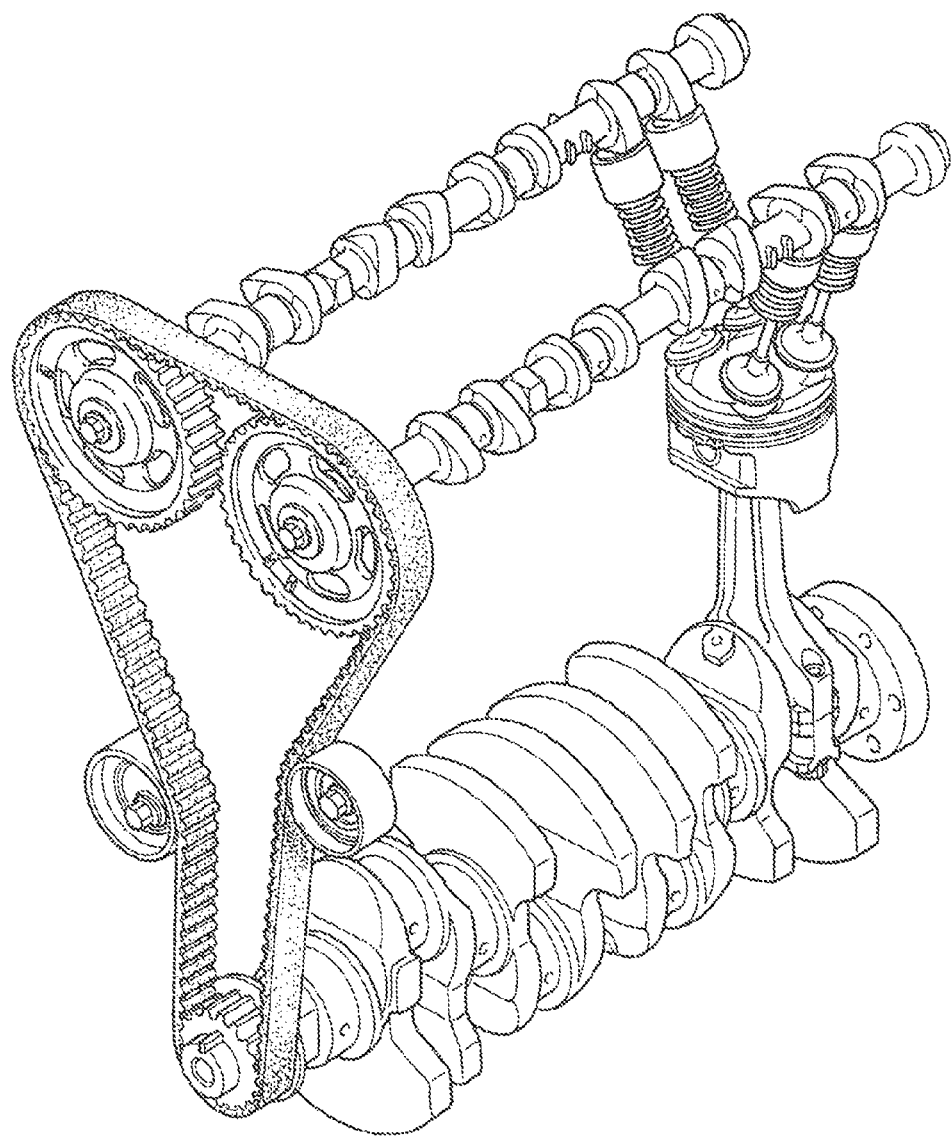
FIG. 1B is a perspective diagram of the structure of a conventional vertical cylinder.

Referring to 1A, the abovementioned design can be applied in various design of engine. The present embodiment is illustrated by a complex V type engine. In the case that the V type engine is workable the other design of engine will have no problem such as a conventional vertical engine as shown in FIG. 1B or other engine structure.

Referring to FIG. 2A, FIG. 2B the design of abovementioned bushing 411 can be modified to have an annular slot 415 disposed on the exterior of the transmission portion 4 and have a flange 416 disposed on the inner rim of the bushing 411. In the same way the flange 416 is inserted into the annular slot 415 to position and an allowance can be left in advance at the bottom of the annular slot 415 to fill with lubricant. Similarly, a flange 414 can be disposed between the bushing 411 and the casing 1 to have the flange inserted into the casing 1 to strengthen stability.

By means of the abovementioned design, taking the piston 7a for example, it is driven by the kinetic energy produced by the explosion in the cylinder and pressurizes the axis of force exertion 51 via the connecting rod 6. The flywheel 5 and the free gear 3 will have the transmission axis 42 as the axis of rotation to rotate around the inner rim of the fixed gear 2 and the output axis 43 outputs the power.

Figures 7, 8:
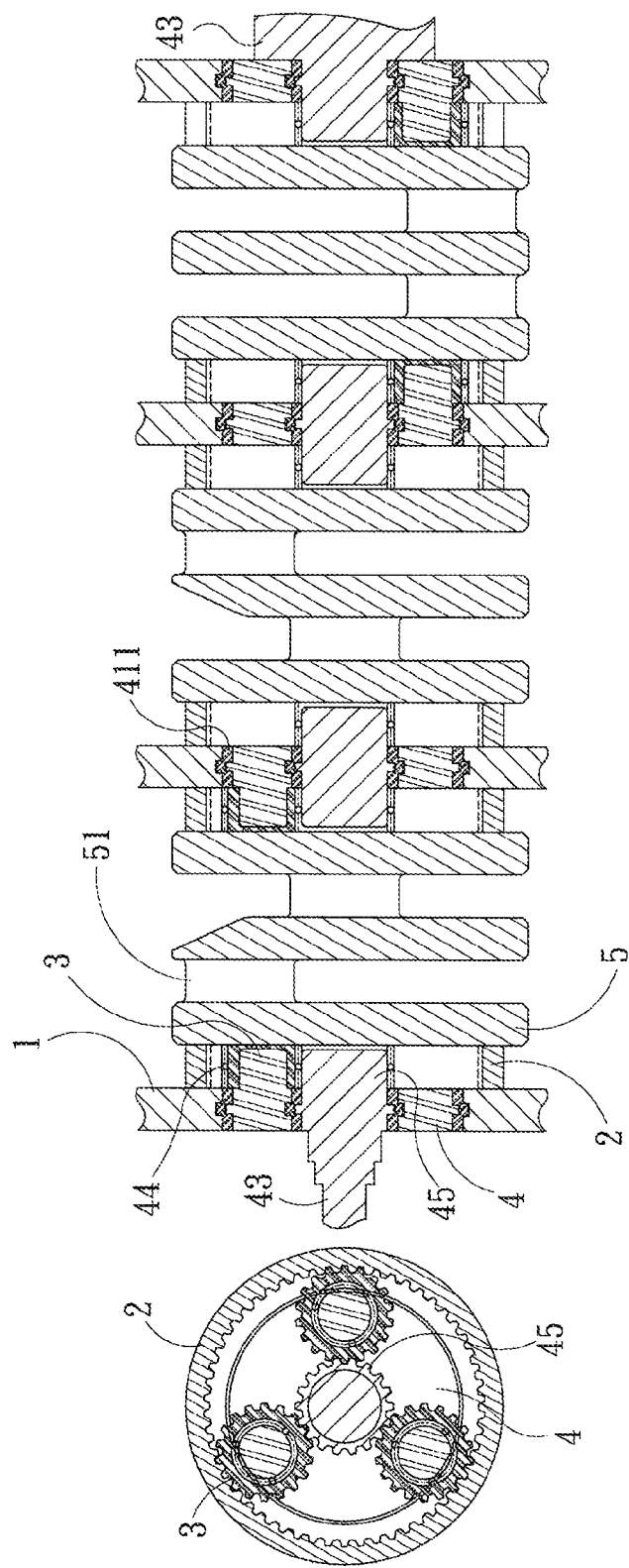
FIG. 7 is a front view of another transmission axis structure variation embodiment of the present invention.
FIG. 8 is a side view of another transmission axis structure variation embodiment of the present invention.

As shown in FIG. 7 and FIG. 8, the transmission portion 4 is disposed with an axis gear 45. The free gear 3 engages the axis gear 45 directly for transmission. As a result, the cylinder power is transmitted via the axis gear 45 which is driven by the free gear 3 synchronously. The tooth quantity of the free gear 3 and the axis gear 45 can be adjusted to vary the rotation speed to get the required speed and power for various aspects.

By means of the abovementioned features of the present invention the way of transmission of the present invention are shown in FIG. 9~FIG. 17 which are illustrated by the way that the free gear 3 engages the axis gear 45 directly. Among them there are three critical points of the transmission axis 42, the axis of force exertion 51, and the engagement point 9 of the fixed gear 2 and free gear 3. When there is an explosion inside the piston 7a the kinetic energy pressurizes the axis of force exertion 51 via the connecting rod 6. The inertia is formed by superposing the pressure from the axis of force exertion 51 toward the transmission axis 42 (force exertion line 01) and the pressure from the counterforce of the engaging point 9 toward the transmission axis 42 (force exertion line 02). The superposed force pressurizes toward the transmission axis 42 via the transmission portion 4 (force exertion line 03). Consequently, the output force is far larger than that of a conventional structure. There is an angle formed between the force exertion line 01 and the force exertion line 02 to superpose the forces by the principle of lever. By means of the structure of the present invention the force exertion line 01 is larger than the force exertion line 02 and provides more output force than the prior art of FIGS. 24A, 24B, 24C and FIGS. 25A, 25B. According to the principle of lever the force exertion arm is longer the output force is larger to make the output axis 43 outputs more power.

Figure 18:
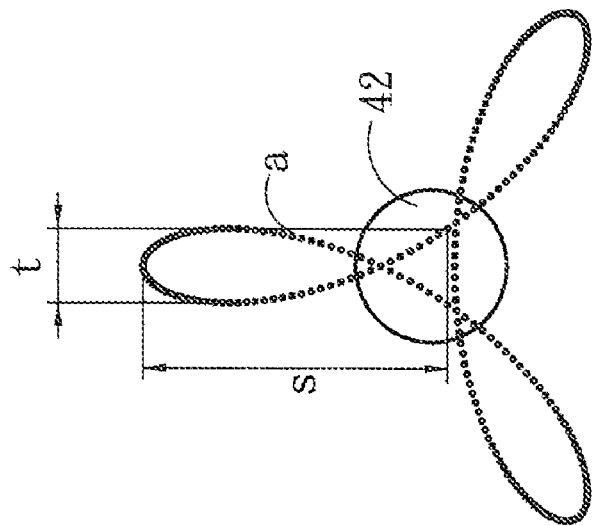
FIG. 18 is a trajectory analysis diagram of the movement of the present invention.

By means of the abovementioned structure when there is an explosion inside the piston 7a the kinetic energy is pressurized on the axis of force exertion 51 via the connecting rod 6. The variation of the lateral pressurizing angle of the connecting rod is very small and most of the inertia works as the power of pushing the free gear 3 and the flywheel to rotate and diminishes the waste of lateral component of force. When the free gear 3 rotates the fixed gear 2 the free gear 3 and flywheel 5 rotate in opposite direction to have the axis of force exertion 51 form the shape of trajectory line a as shown in FIG. 18.

Figure 5:
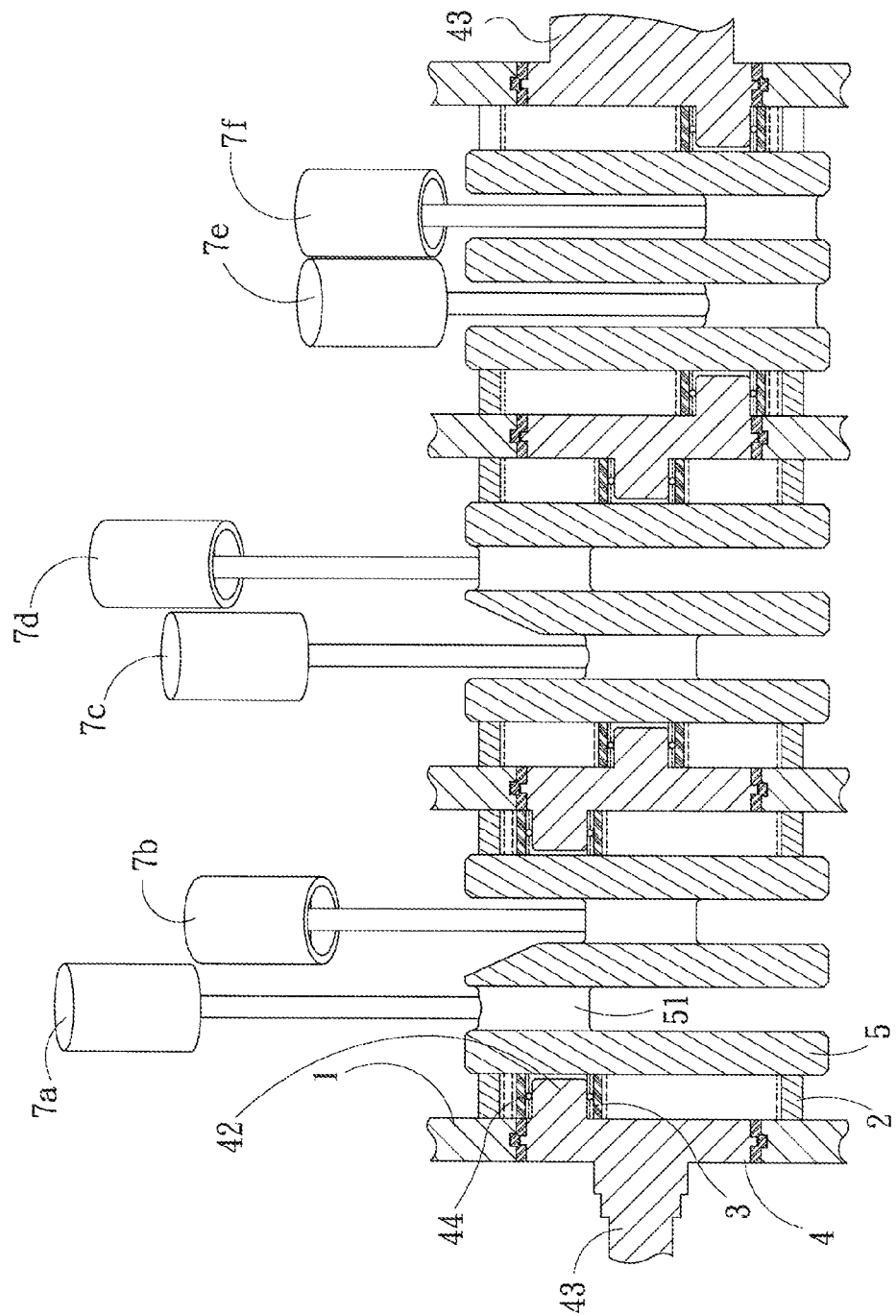
FIG. 5 is a front view of the invention including piston and connecting rod.
Figure 6:
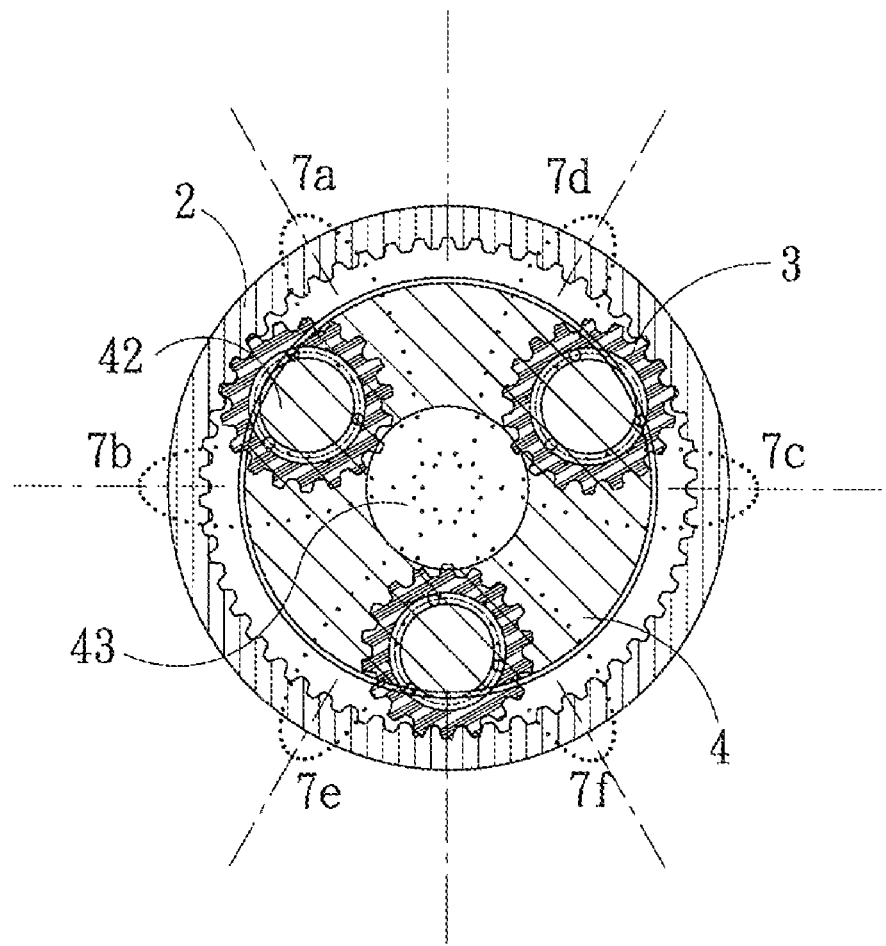
FIG. 6 is a trajectory diagram of the movement of the V6 type double track cylinder of the present invention.

By means of the description of the abovementioned trajectory line "a", the present invention can be formed with the disposition mode of a plurality of cylinders, multi-angle and multiple trajectories. As shown in FIG. 5 and FIG. 6 it is a six cylinders engine of which there are two cylinders disposed corresponding to the direction of each transmission axis gear 42. Each cylinder is disposed by 60° as the transmission axis 42 is the axis and has the trajectory line as shown in FIG. 6. Due to each force exertion axis 51 has its own trajectory line it can work stably without collision in operation and have the power of each cylinder with multiplication effect.

Figure 9:
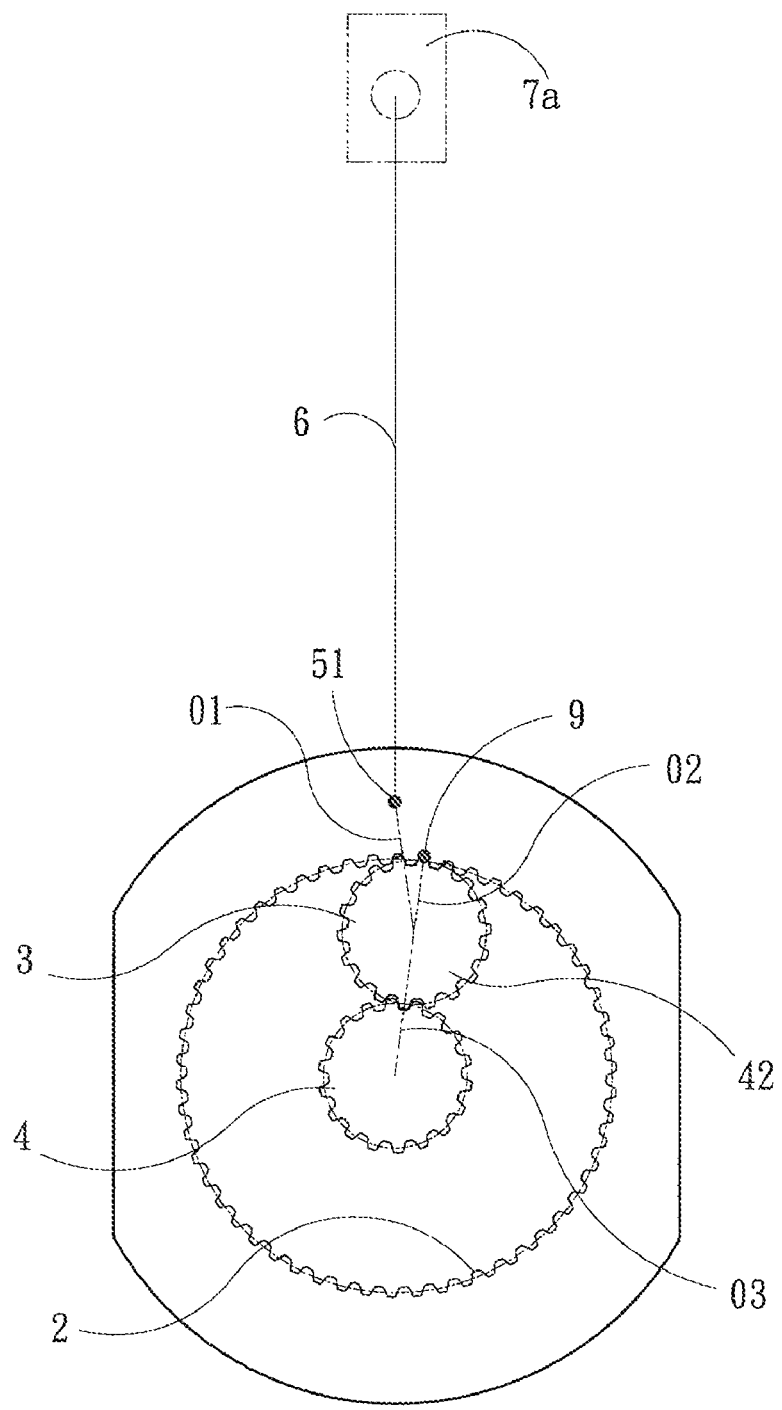
FIG. 9~FIG. 17 are the movement sequence diagrams of the present invention.
Figure 10:
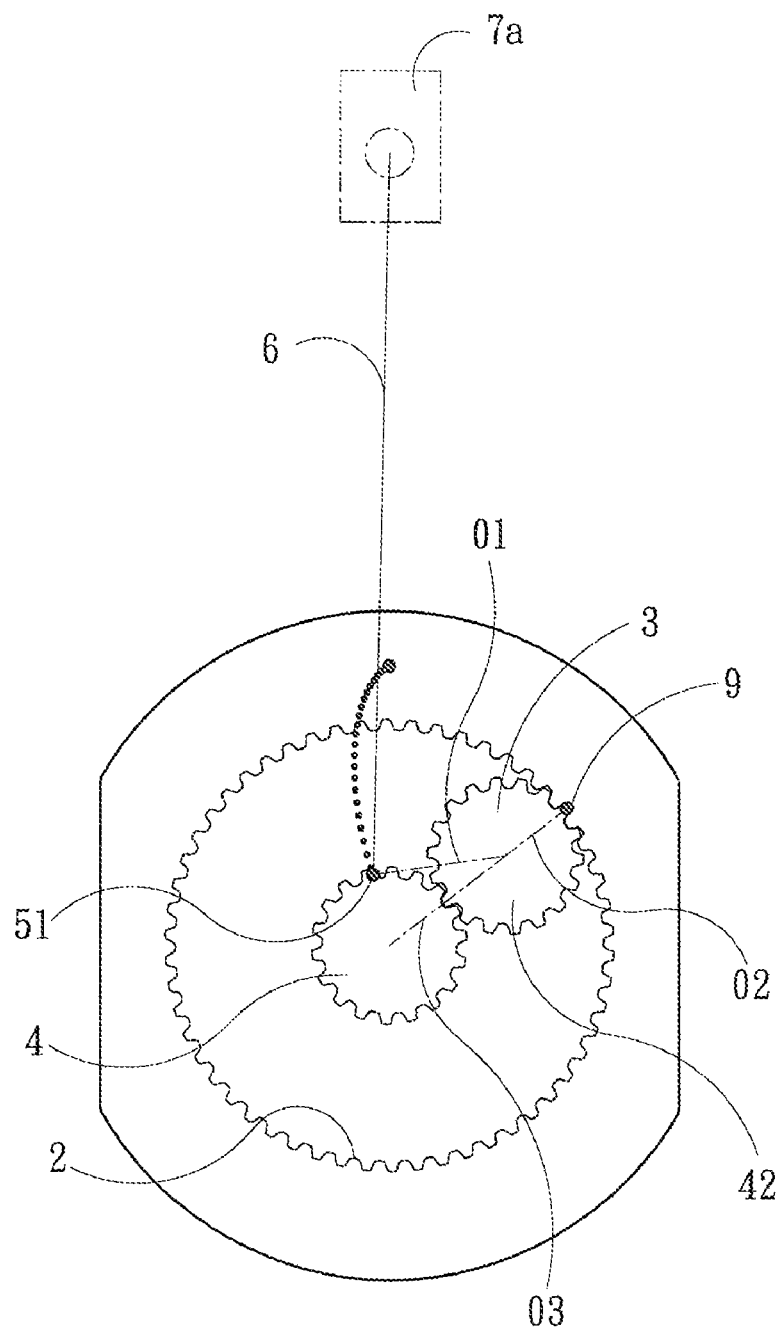
Figure 11:
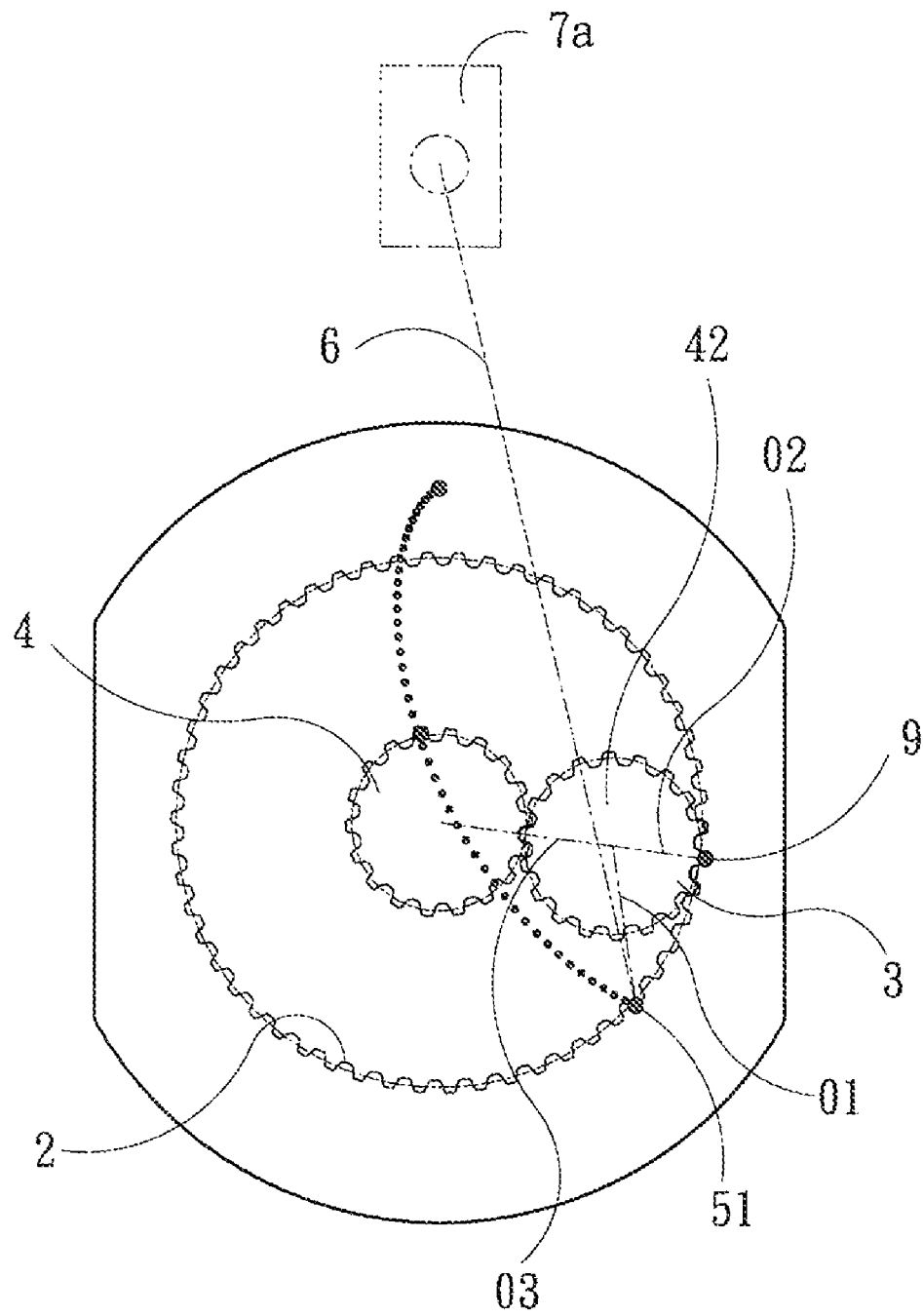
Figure 12:
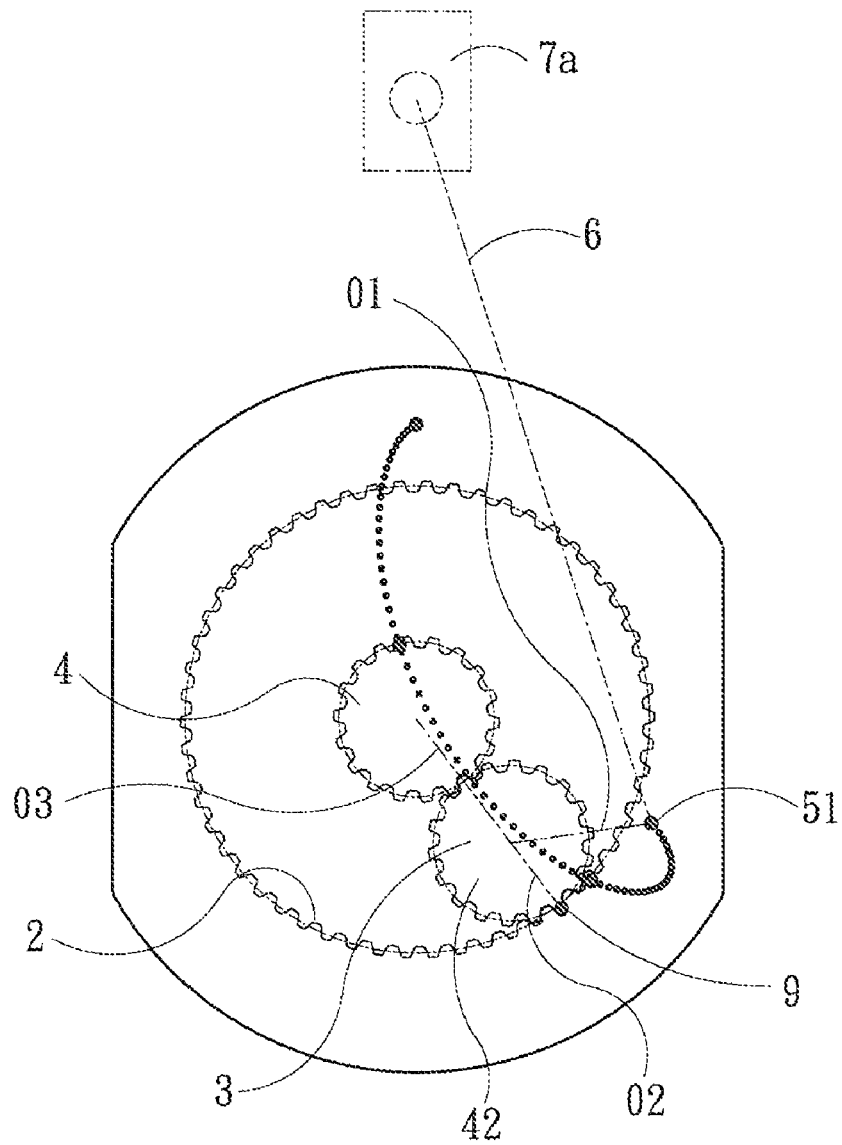
Figure 13:
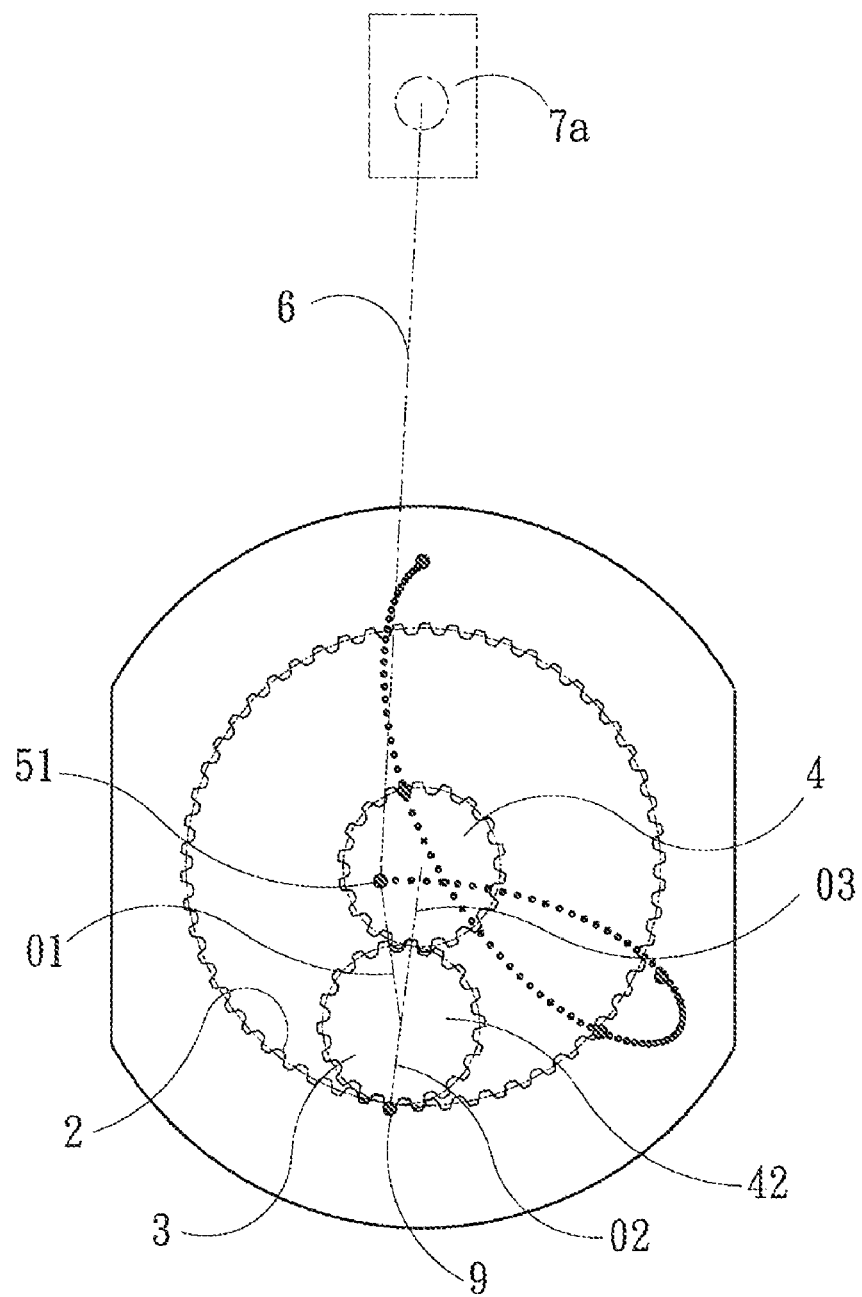
Figure 14:
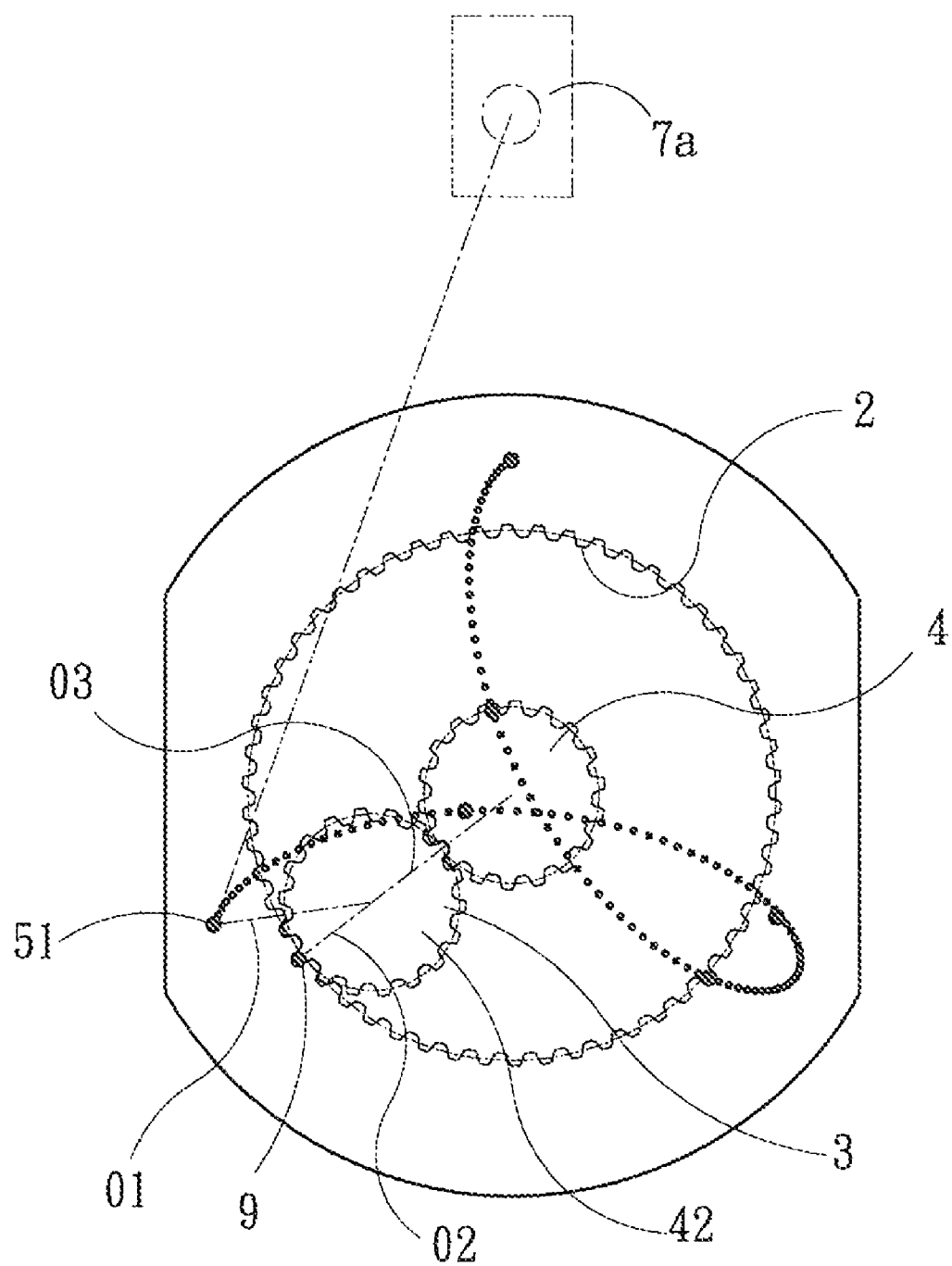
Figure 15:
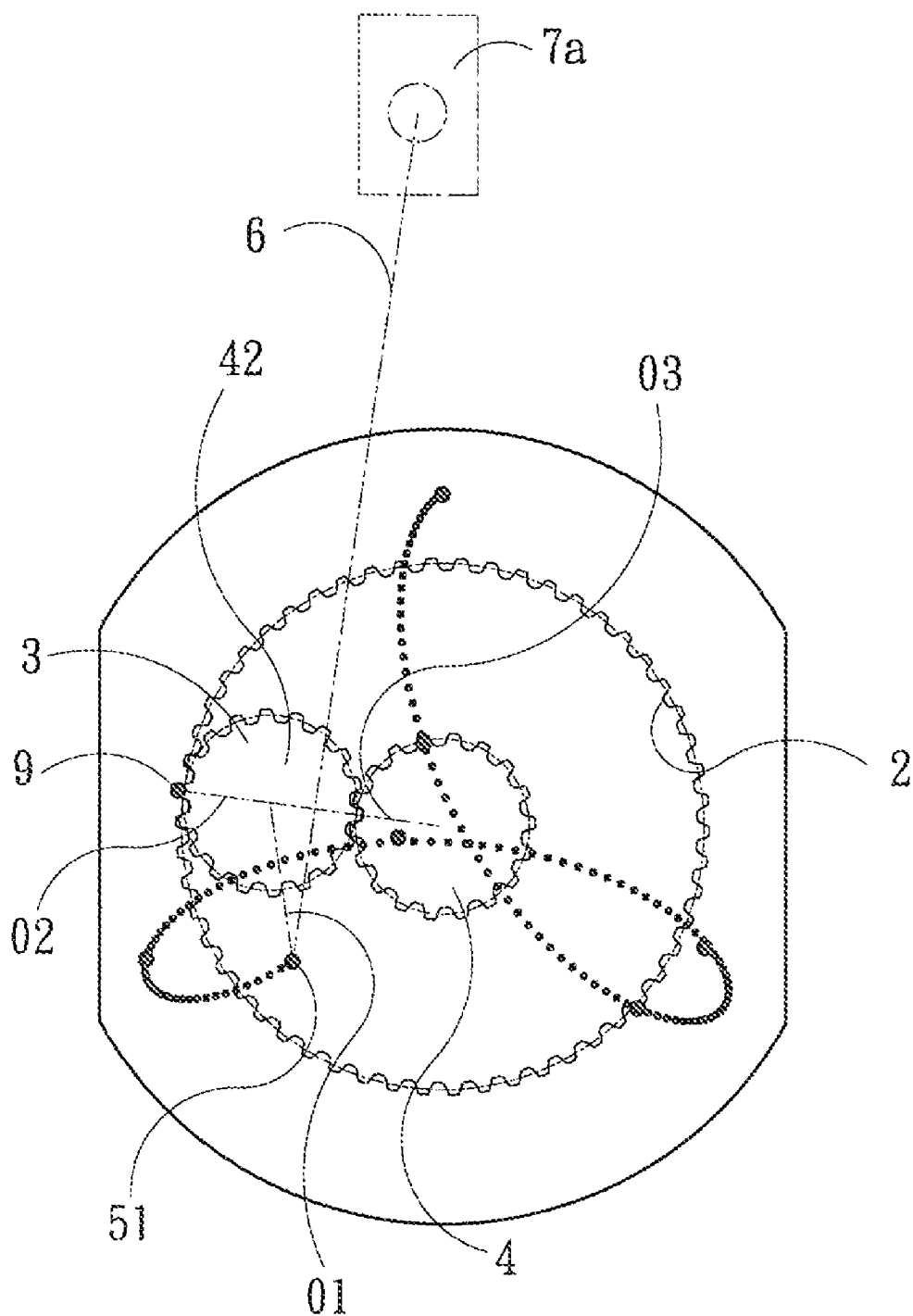
Figure 16:
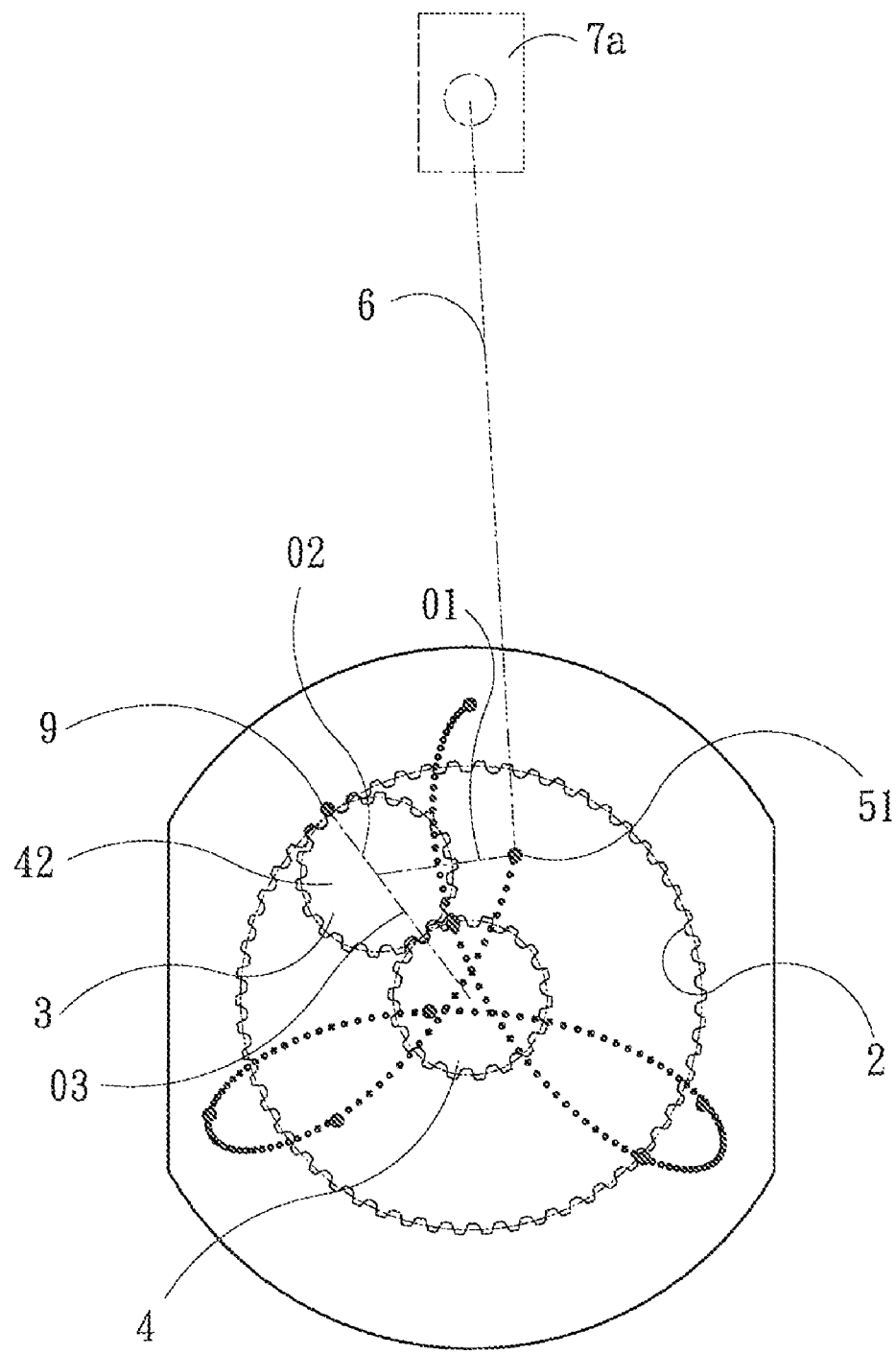

The abovementioned six cylinders engine includes four rotation directions of the transmission axis 42. The disposition of cylinders is shown as the positions of pistons 7a, 7c, 7e of FIG. 5. The cylinder of each transmission axis 42 is disposed by 120°, i.e. each cylinder carries one third output of the kinetic energy. When the first cylinder starts explosion stroke the trajectory line "a" of the piston 7a between upper and lower stroke is shown in FIG. 9~FIG. 11. Such an inertia course produces the trajectory segments of the inertia course as shown in FIG. 18 which approximates a straight line so that most of the inertia of the connecting rod 6 exerts on the free gear 3 to rotate and diminishes the loss of lateral component of force. When the piston 7a arrives the end of the stroke and diminishes movement, the change of trajectory line "a" is as shown in FIG. 12. When entering the trajectory segment t as shown in FIG. 18, at this moment the connecting rod 6 is deflected toward the second cylinder to compress the second cylinder. Then the second cylinder goes into the explosion stroke as shown in FIG. 13~FIG. 17. The piston 7c of the second cylinder compresses the third cylinder. At this moment the piston 7a of the first cylinder recedes to exhaust. In such way when the piston 7a produces the maximum inertia thrust, most of the inertia thrust exerts on the free gear 3 for rotation. Consequently, it enhances the kinetic energy output to a large extent. The abovementioned pistons 7b, 7d, 7f form another power stroke which trajectory line is different from that of the pistons 7a, 7c, 7e by 60°.

At the same time no matter how cylinders are disposed, referring to the trajectory line of FIG. 6, the stroke of each cylinder will move forward or move away toward the center of output axis 43 concurrently at the same time. Therefore the weight distribution of each cylinder (flywheel) is maintained balance at any time to diminish vibration and power loss.

Furthermore, a conventional engine has to undergo four actions of induction, compression, explosion and exhaust to complete a stroke, i.e. every cycle outputted by engine is merely a half power of explosion. Therefore the revolving speed of engine has to be faster and the output torsion is lower. In the present invention there are three cylinders disposed concurrently in each power stroke. Each cylinder proceeds explosion in order, i.e. merely rotates 120° in each explosion. The power is huge and the loss of kinetic energy is low in the present invention. As a result, the present invention will achieve the functions of low revolving speed and high torsion.

Figure 19:
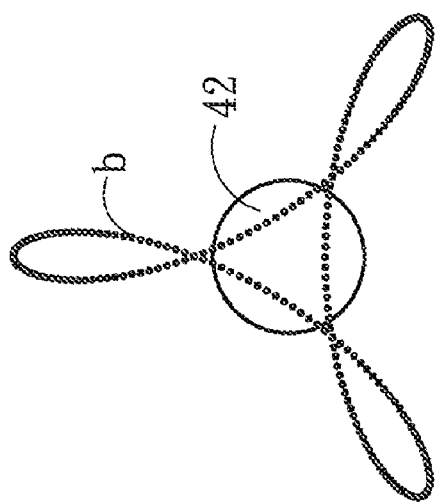
FIG. 19 is a trajectory analysis diagram of the axis of force exertion with low height of the present invention.

Additionally, as shown in FIG. 18 and FIG. 19, the abovementioned kinetic energy generation apparatus having increased power energy is mainly applied on various demands wherein by changing the height of the axis of force exertion 51, for example the axis of force exertion 51 of FIG. 19 is slightly lower than that of FIG. 18, the variation of trajectory segment "t" will be changed, and vice versa. Herewith, depending on the demand the variation of trajectory lines a, b can be changed too.

Figure 17:
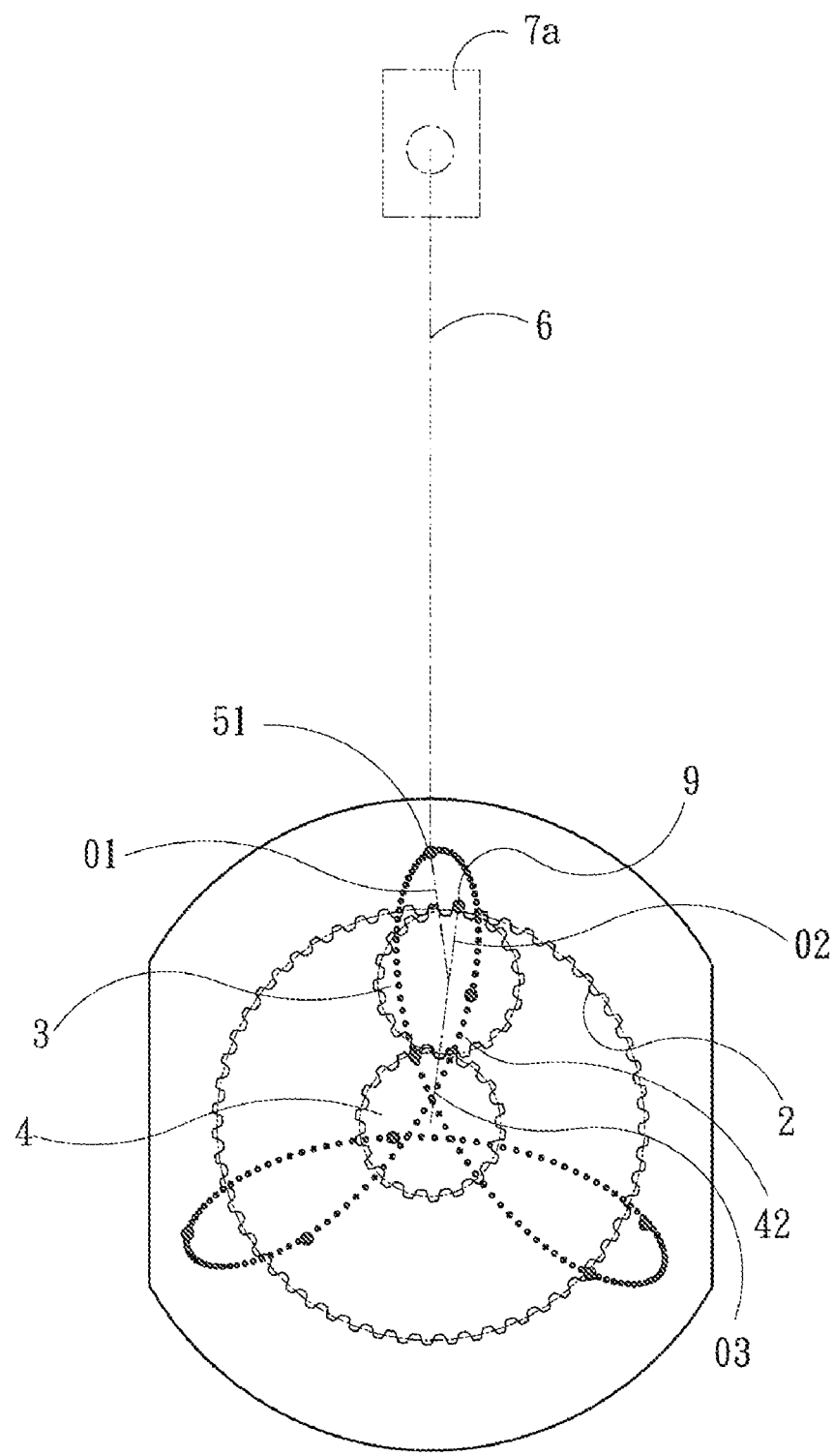
Figure 20:
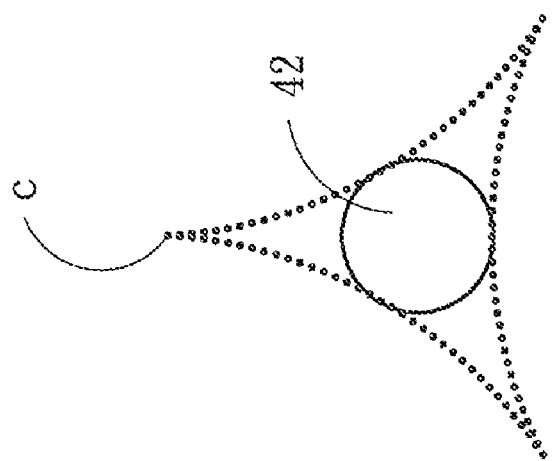
FIG. 20 is a trajectory analysis diagram of the axis of force exertion with lower height of the present invention.

Furthermore, as shown in FIG. 20 the height of the axis of force exertion 51 is further lowered. In the present invention the transmission axis 42 can be driven by other power apparatus to rotate. The power is outputted via the free gear 3, flywheel 5 and axis of force exertion 51, connecting rod 6 and finally piston 7a to compress the cylinder, i.e. in the application of compressor structure the kinetic energy is transmitted back to piston 7a for compression to output energy. Furthermore, the cylinder quantity of the present invention is designed in a multiple of three. If the quantity is decreased the balance will be lowered and cause vibration effect which can be applied in the structure of a message chair or a vibration apparatus. Certainly, depending on the need of user a trajectory line "c" as shown in FIG. 20 will be formed by lowering the height of the axis of force exertion 51 as shown in FIG. 17.

Figure 21:
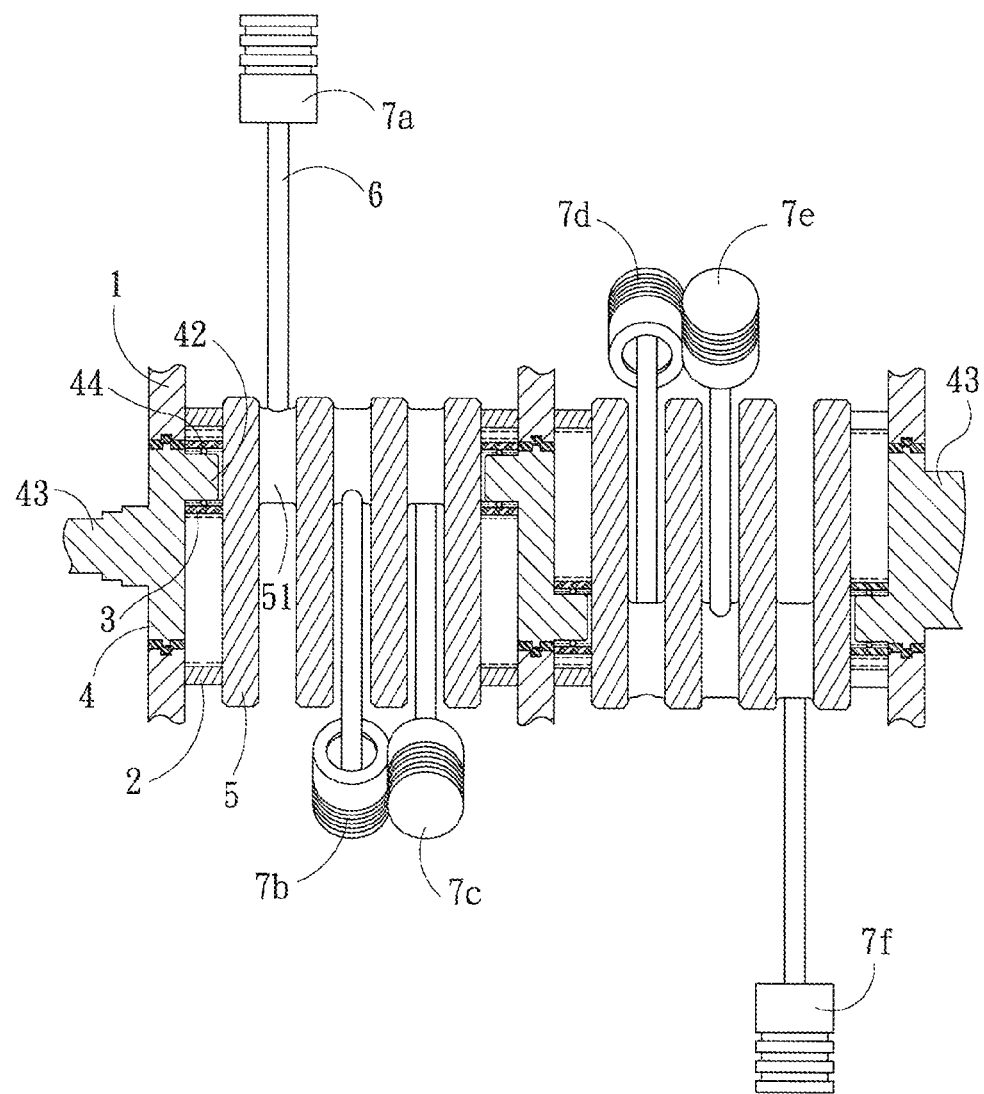
FIG. 21 is a front view of the structure of another embodiment of the present invention.
Figure 22:
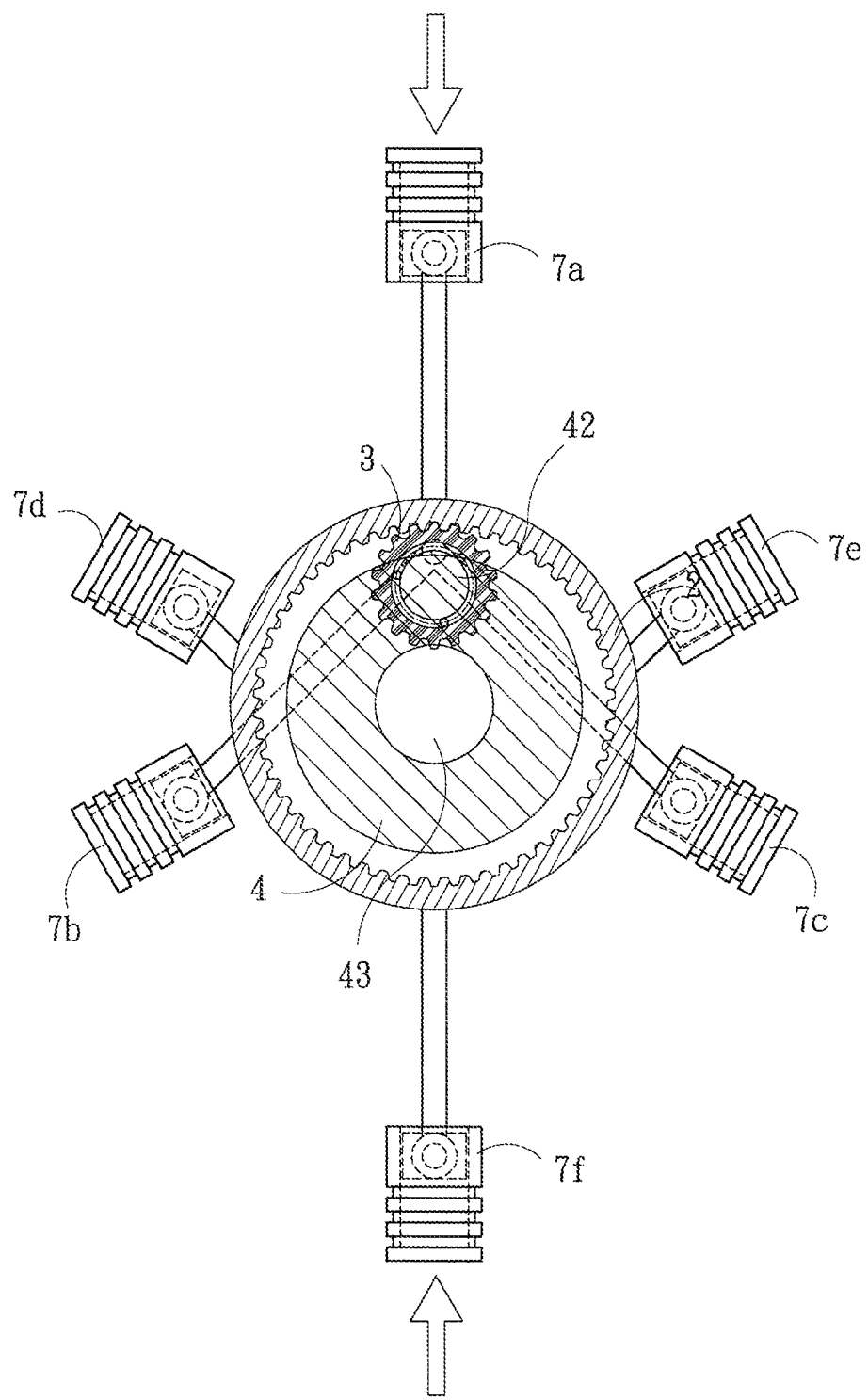
FIG. 22 is a side view of double sets cylinders disposition structure of another embodiment of the present invention.
Figure 23:
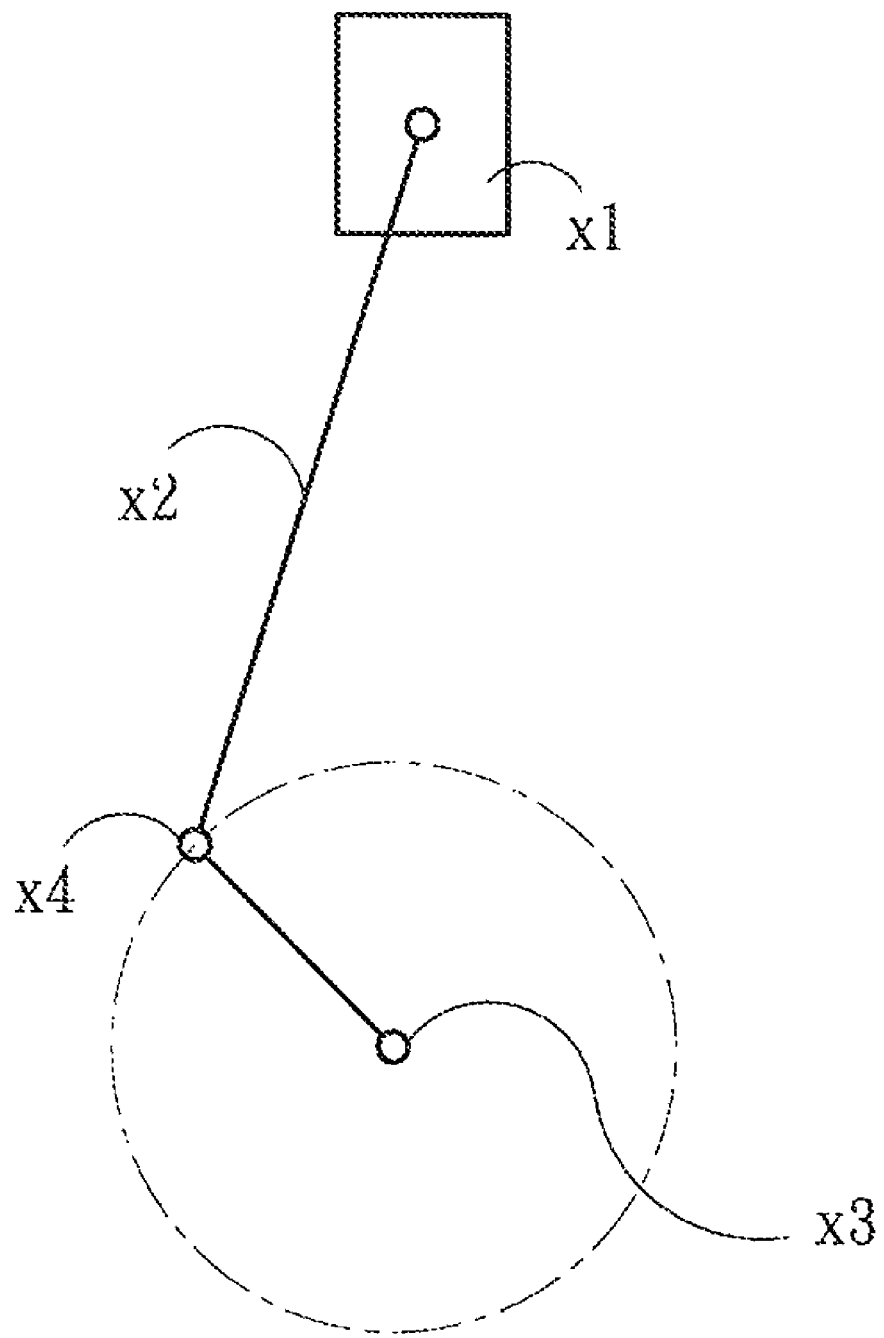
FIG. 23 is a schematic diagram of the movement of a conventional crankshaft cylinder.
Figure 24:
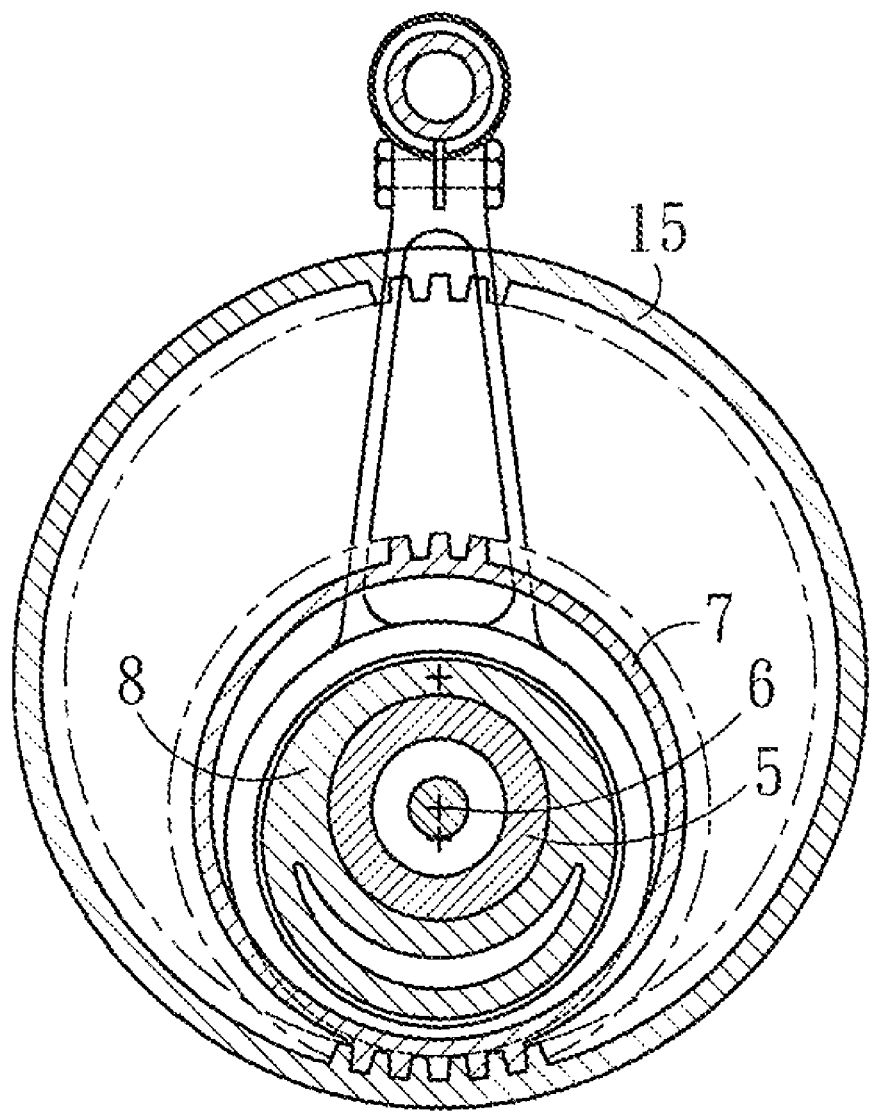
FIG. 24 is a schematic diagram of the structure of U.S. Pat. No. 4,044,629.
Figure 25:
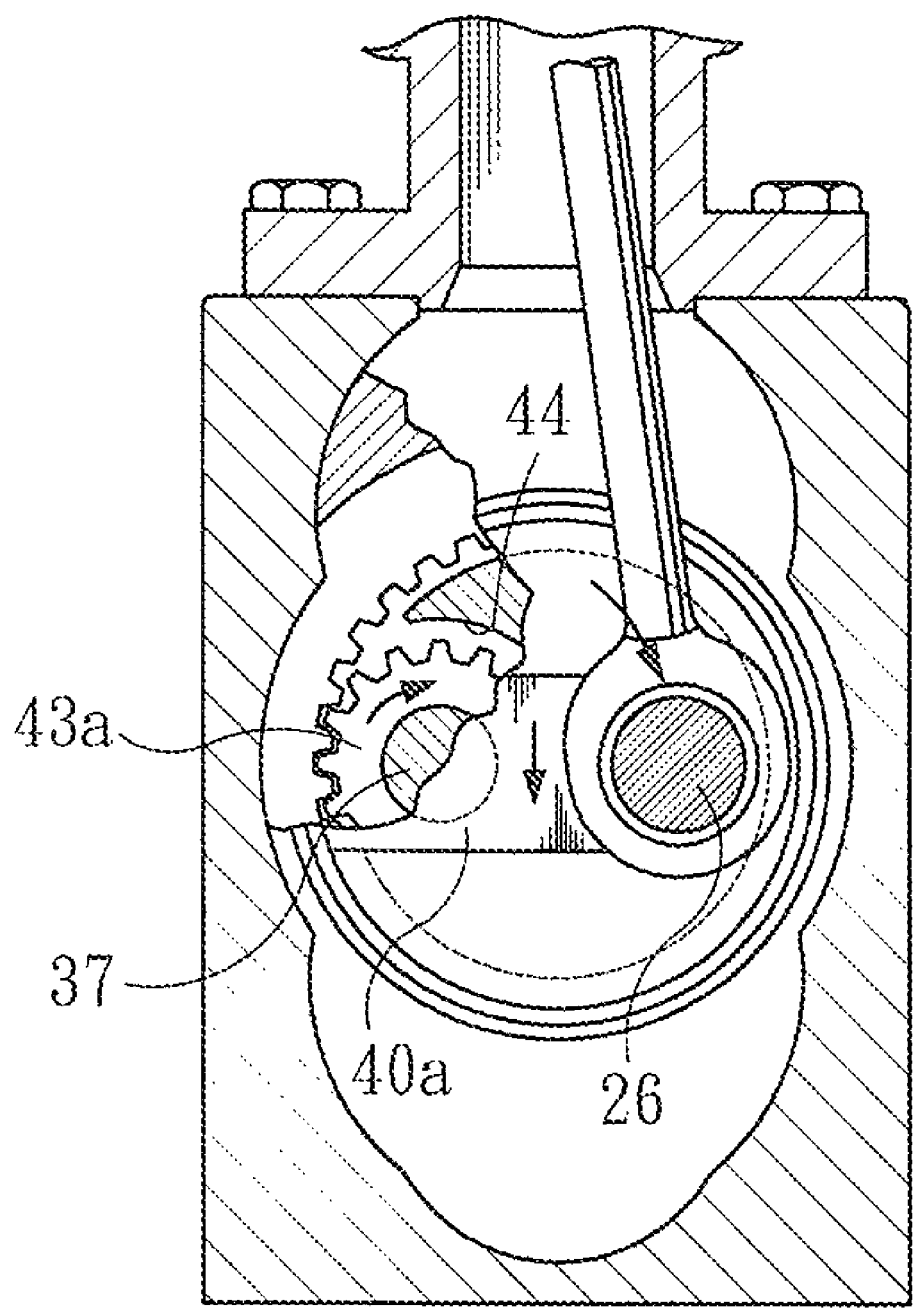
FIG. 25 is a schematic diagram of the structure of U.S. Pat. No. 4,073,196.
Figure 26A:
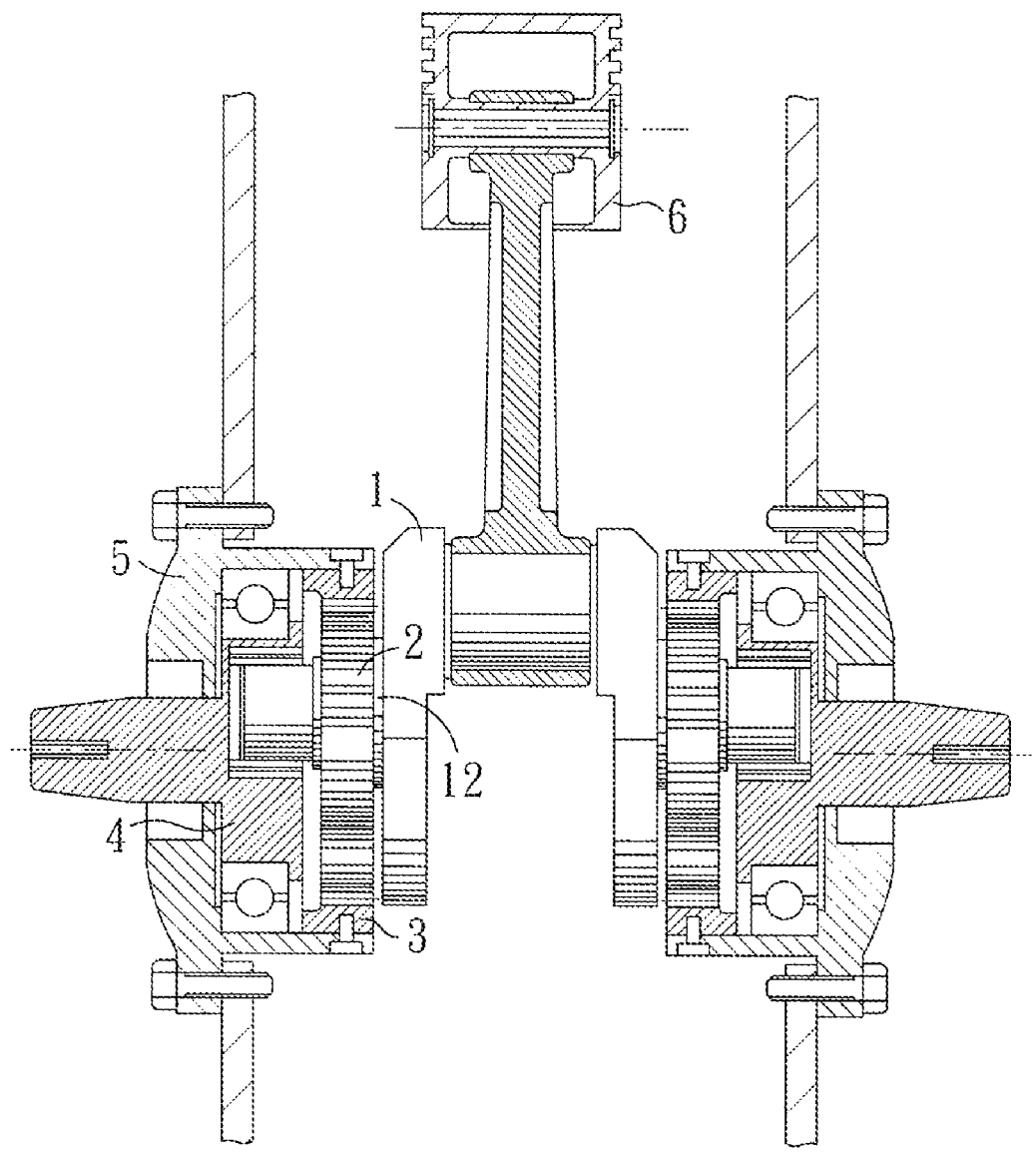
FIG. 26A is a schematic diagram of the structure of UK patent with patent number GB2297599A.
Figure 26B:
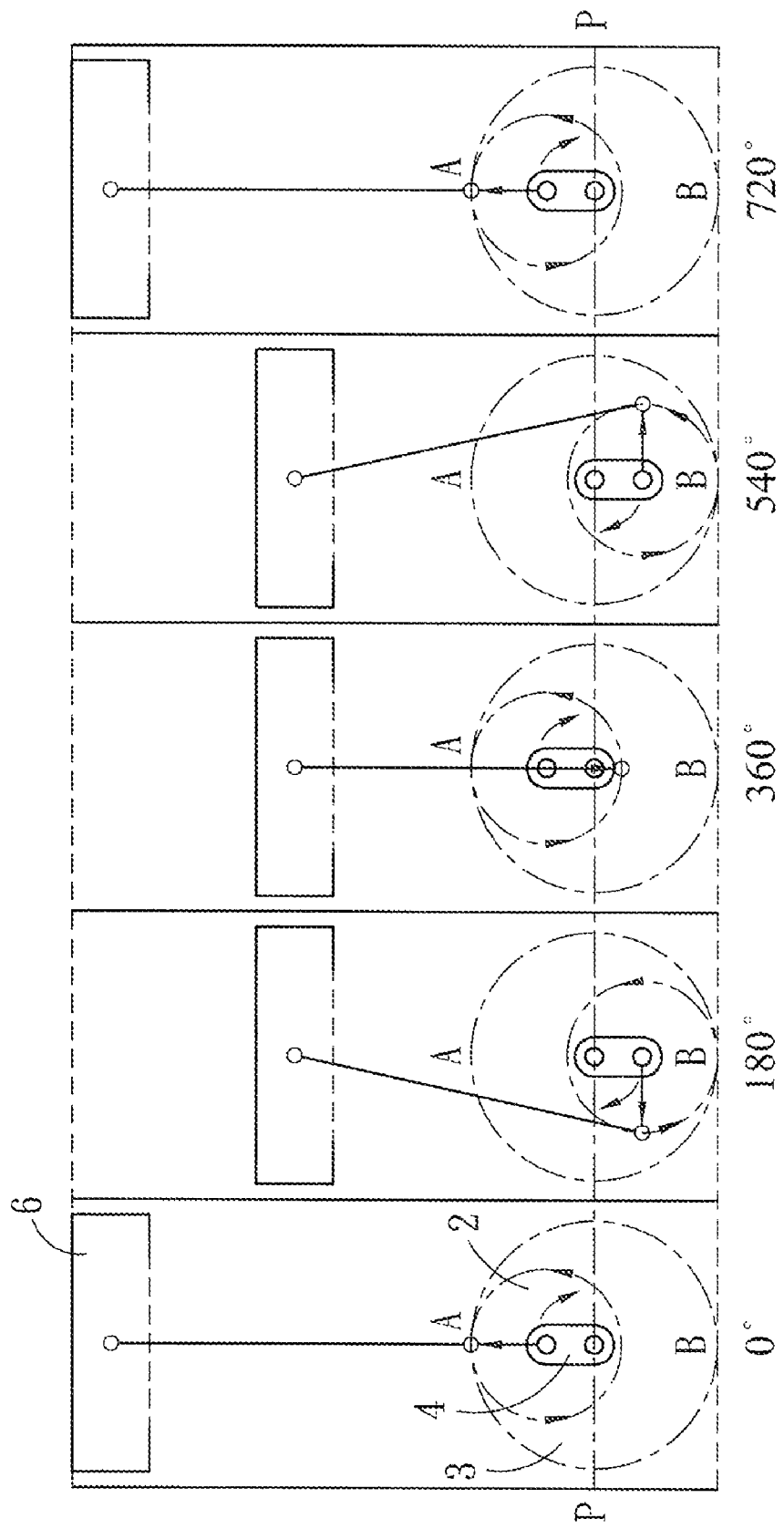
FIG. 26B is a schematic diagram of the movement of UK patent with patent number GB2297599A.
Figure 26C:
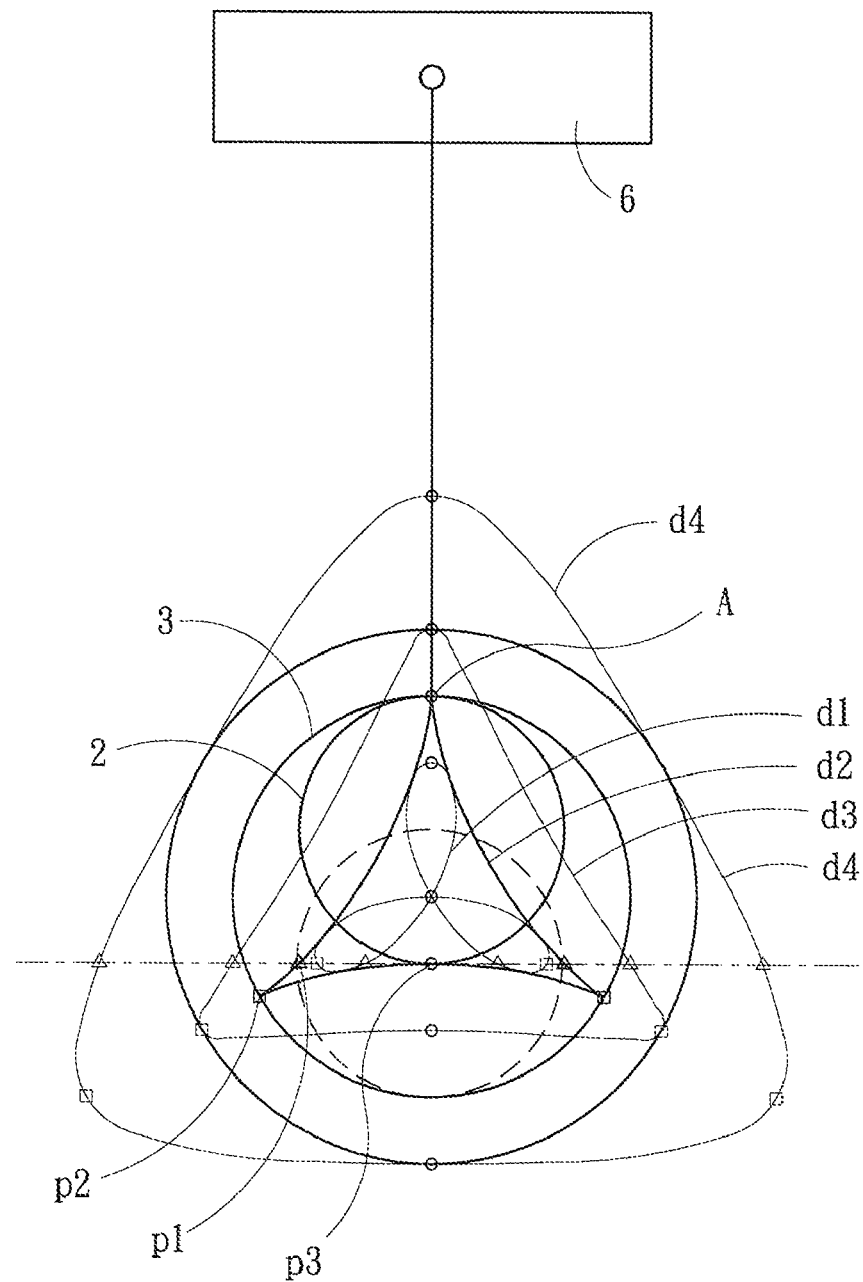
FIG. 26C is a trajectory analysis diagram of UK patent with patent number GB2297599A.
Figure 27B:
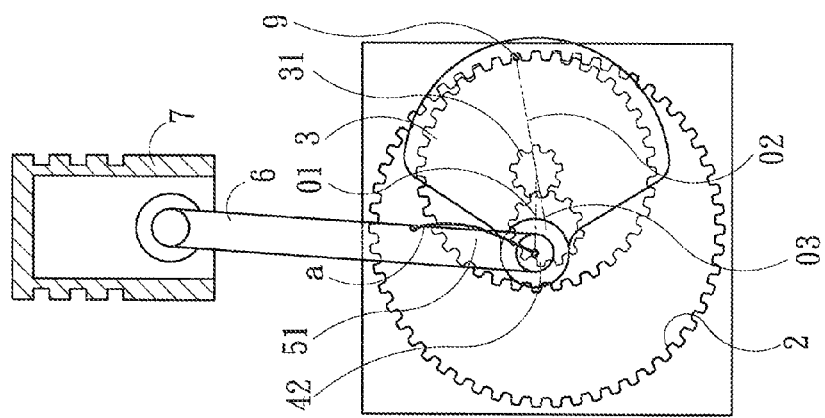
FIGS. 27A, 27B, 27C are schematic diagrams of the structure of PCT/CN2005/000992.
Figure 27A:
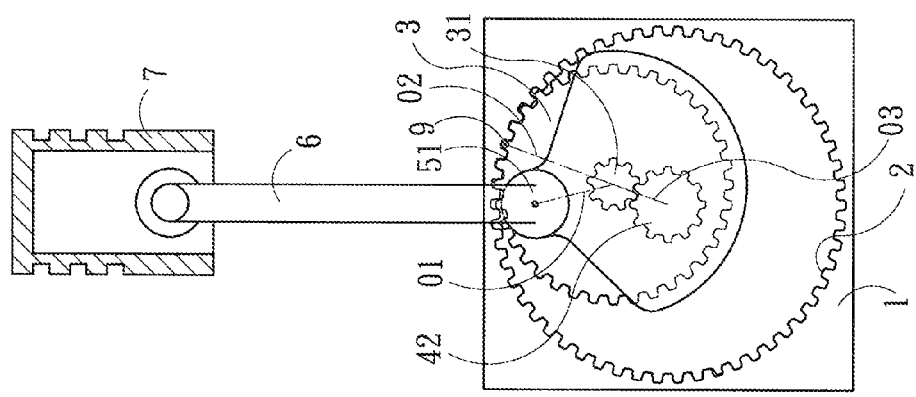
Figure 27C:
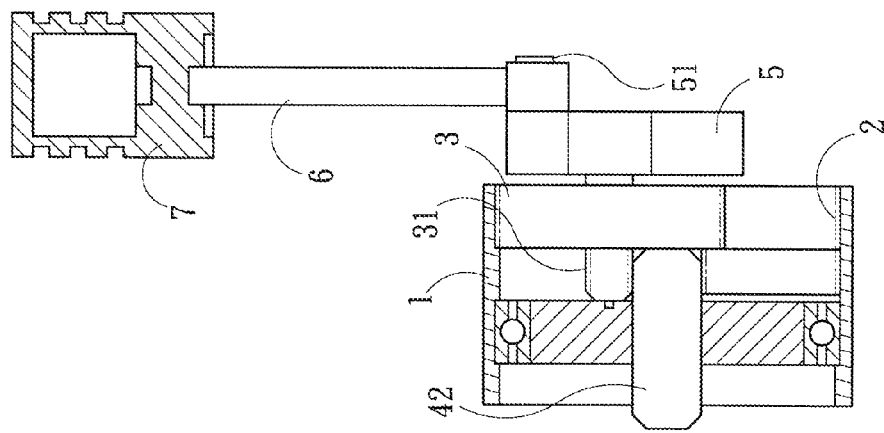
Figures 28A, 28B:
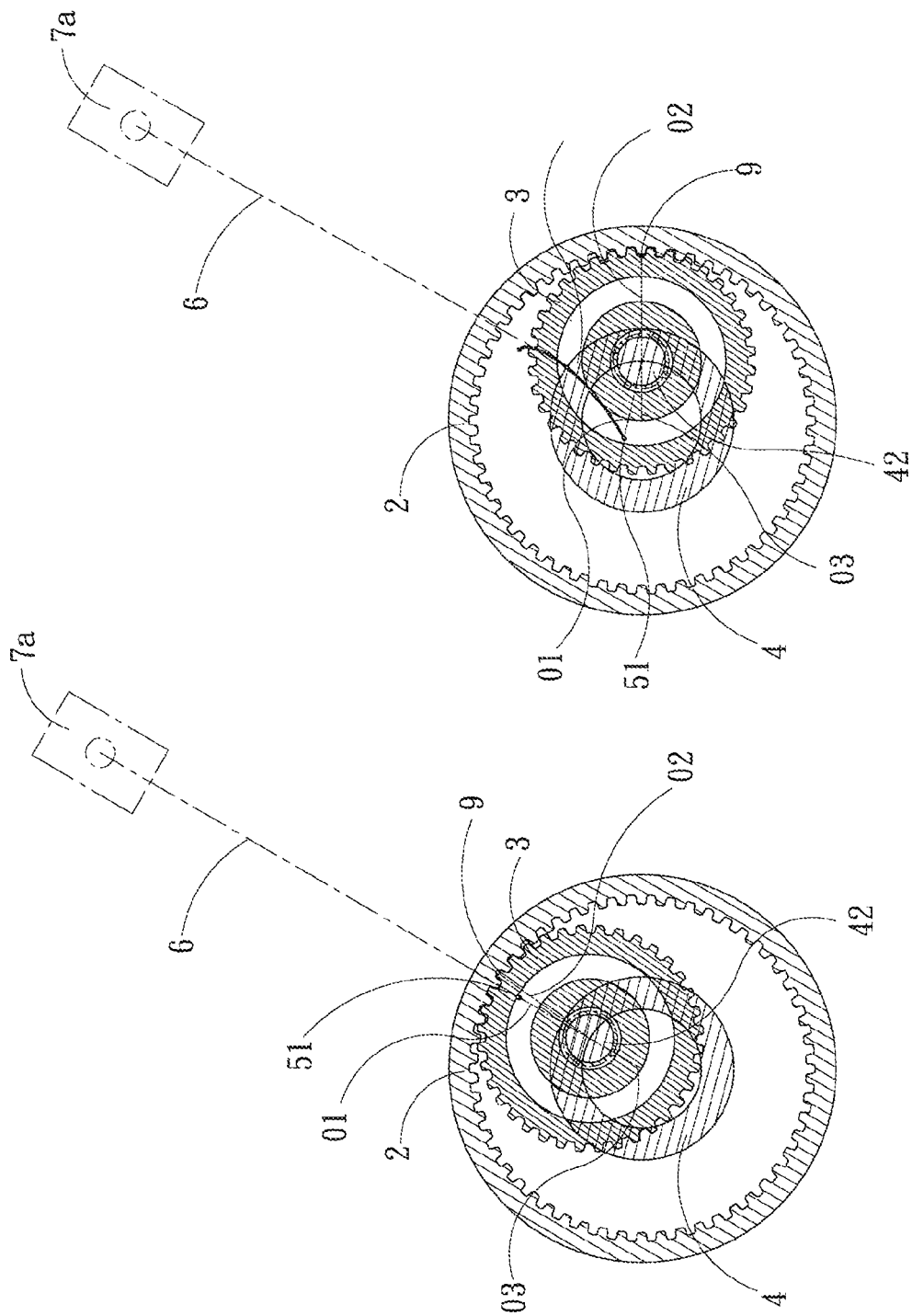
FIGS. 28A, 28B are schematic diagrams of the structure of PCT/CN2006/002106.

Referring to FIGS. 21, 22 the cylinder and pistons 7a~7f thereof and connecting rod 6 are disposed in the multiple of three relative to each transmission axis 42. As the six cylinders structure in the drawings they can be divided into two groups which are symmetric, rotated 180° and disposed at both ends of the casing 1. The symmetric cylinders are proceeded with the same stroke so as to balance and double the force to rotate the free gear 3. Such a structure is suitable for the vertical engine with horizontal cylinders. As a result the present invention is suitable for various kinds of vertical, horizontal engine or even air compressor and compressor.

Furthermore, when the abovementioned piston 7a is at the start point of stroke the transmission axis or axis gear 46 (engaging point 9) is deflected an angle in advance relative to the extension direction from the connecting rod 6 toward the force exertion point 51 to have an angle formed between the force exertion line 01 and force exertion line 02 to produce the effect of force superposition of the force exertion line 01 and force exertion line 02.

By means of the abovementioned embodiment comparing the present invention and the conventional structures of FIG. 18, FIG. 24A, FIG. 24B, FIG. 24C, FIG. 25A, and FIG. 25B, the two main differences between the present invention with gear ratio 3:1 and the abovementioned two conventional patents with gear ratio 3:2 in practical application are as following.

Firstly it is the disposition of a bushing which enables the transmission portion 4 to be fixed stably inside the casing 1. Under the circumstance of high speed and huge pressure the stability of whole structure is maintained to prevent unnecessary vibration loss and maintain the life time of product.

Secondly it is the variation of force exertion line. The main force exertion line 01 of the present invention is longer than the force exertion line 02 of the counterforce. It means the force of the transmission axis 43 transmitted by cylinder via the connecting rod 6 is larger so as to acquire higher output power. At the same time the length of force exertion line 03 is far larger than that of the prior art. According to the principle of lever the longer the force exertion arm of the apparatus the more output force it is so that the output power of the output axis 43 is larger.

Furthermore, under the structure of the present invention, no matter how the cylinders are disposed the stroke of each cylinder will move forward or move away toward the center of output axis 43 synchronously at the same time. Consequently, the weight distribution of each cylinder can be maintained balance at any time and the vibration and power loss are diminished too.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A kinetic energy generation apparatus having increased power energy, comprising:
   a casing;
   a fixed gear disposed on one side of the casing and having a retracting tooth profile
   a free gear disposed on an inner side of the fixed gear and having an extending tooth profile so that the fixed gear and the free gear engage with each other for transmission and have a gear ratio as 3:1;
   a rotatable transmission portion pivoted inside the casing and connected an output axis to output kinetic energy, which is inserted toward the position of an axis center of the free gear and pivoted with a transmission axis to have the transmission axis and free gear included within a volume of the fixed gear;
   a bushing disposed between the casing and the transmission portion;
   a flywheel fixed to an outer side of the free gear and having an axis of force exertion at one end;
   a connecting rod pivoted on the axis of force exertion and having one end pivoted on a upper portion of the axis of force exertion and the other end pivoted on a piston of a cylinder; and
   herewith the variation in lateral pressure angle of a trajectory line of the axis of force exertion is very small to diminish waste of lateral component of force.

2. The kinetic energy generation apparatus having increased power energy according to claim 1, further comprising a flange disposed between the casing and a contact surface of the transmission portion to be inserted and positioned between the bushing and the casing or the transmission portion.

3. The kinetic energy generation apparatus having increased power energy according to claim 1, wherein a quantity of cylinders is provided in the multiple of three relative to each transmission axis and three cylinders are disposed by 120°.

4. The kinetic energy generation apparatus having increased power energy according to claim 1, wherein a quantity of cylinders is provided in the multiple of three relative to each transmission axis and the cylinders are disposed by various angle.

5. The kinetic energy generation apparatus having increased power energy according to claim 1, wherein the trajectory line is disposed with a plurality of cylinders concurrently so that each cylinder has independent power trajectory course.

6. The kinetic energy generation apparatus having increased power energy according to claim 1, wherein the axis of force exertion of each power stroke is disposed with a plurality of cylinders currently and distributed at positions with different angle of same trajectory line.

7. The kinetic energy generation apparatus having increased power energy according to claim 1, wherein when the piston is at a start point of a stroke the transmission axis is deflected an angle in advance relative to an extension direction of the connecting rod.

8. The kinetic energy generation apparatus having increased power energy according to claim 1, wherein a height of the axis of force exertion is adjustable to vary the trajectory line and suitable for various kind of power apparatus.

9. The kinetic energy generation apparatus having increased power energy according to claim 1, wherein the transmission portion is provided with an axis gear so that the free gear engages the axis gear directly to transmit power.

10. The kinetic energy generation apparatus having increased power energy according to claim 9, wherein tooth quantities of the free gear and the axis gear are adjustable to adjust speed.

* * * * *